(12) United States Patent
Hara

(10) Patent No.: US 11,005,382 B2
(45) Date of Patent: May 11, 2021

(54) SYNCHRONOUS RECTIFICATION CONTROLLING DEVICE, ISOLATED SYNCHRONOUS-RECTIFICATION DC-DC CONVERTER, GATE DRIVING DEVICE, ISOLATED DC-DC CONVERTER, AC-DC CONVERTER, POWER ADAPTER, AND ELECTRIC APPLIANCE

(71) Applicant: Rohm Co., Ltd., Kyoto (JP)

(72) Inventor: Hideo Hara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/592,856

(22) Filed: Oct. 4, 2019

(65) Prior Publication Data

US 2020/0112266 A1 Apr. 9, 2020

(30) Foreign Application Priority Data

Oct. 5, 2018 (JP) .............................. JP2018-190194
Oct. 5, 2018 (JP) .............................. JP2018-190201

(51) Int. Cl.
*H02M 3/335* (2006.01)
*H02M 7/217* (2006.01)

(52) U.S. Cl.
CPC ....... *H02M 3/33592* (2013.01); *H02M 7/217* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
USPC .................................. 363/21.06, 21.14, 127
See application file for complete search history.

(56) References Cited

U.S. PATENT DOCUMENTS

| 2008/0212247 | A1* | 9/2008 | Lee ...................... | H03K 17/163 |
| | | | | 361/88 |
| 2013/0100712 | A1* | 4/2013 | Hayasaki .......... | H02M 3/33592 |
| | | | | 363/21.12 |
| 2016/0261200 | A1 | 9/2016 | Yabuzaki | |
| 2016/0261204 | A1* | 9/2016 | Kikuchi ............ | H02M 3/33592 |

FOREIGN PATENT DOCUMENTS

| JP | 2002-136115 | 5/2002 |
| JP | 2016-163438 | 9/2016 |

* cited by examiner

*Primary Examiner* — Bryan R Perez
(74) *Attorney, Agent, or Firm* — Fish & Richardson P.C.

(57) ABSTRACT

In an isolated DC-DC converter, in response to a switching transistor connected to the primary winding of a transformer turning off, a turn-on control circuit turns on a synchronous rectification transistor on the secondary side. A turn-off control circuit determines the turn-off time point of the synchronous rectification transistor by charging a capacitor with a current commensurate with the magnitude of an induced voltage appearing in the secondary wiring of the transformer during the on-period of the switching transistor and, after the synchronous rectification transistor turns on, discharging the capacitor with a current commensurate with the output voltage of the DC-DC converter.

21 Claims, 18 Drawing Sheets

SYNCHRONOUS RECTIFICATION CONTROLLING DEVICE, ISOLATED SYNCHRONOUS-RECTIFICATION DC-DC CONVERTER, GATE DRIVING DEVICE, ISOLATED DC-DC CONVERTER, AC-DC CONVERTER, POWER ADAPTER, AND ELECTRIC APPLIANCE

CROSS-REFERENCE TO RELATED APPLICATIONS

This nonprovisional application claims priority under 35 U.S.C. § 119(a) on Patent Application No. 2018-190194 filed in Japan on Oct. 5, 2018 and on Patent Application No. 2018-190201 filed in Japan on Oct. 5, 2018, the entire contents of which are hereby incorporated by reference.

BACKGROUND OF THE INVENTION

1. Field of the Invention

The present invention relates to a synchronous rectification controlling device, an isolated synchronous-rectification DC-DC converter, a gate driving device, an isolated DC-DC converter, an AC-DC converter, a power adapter, and an electric appliance.

2. Description of Related Art

FIG. 21 is an outline configuration diagram of a common isolated synchronous-rectification DC-DC converter 901 of a flyback type. A direct-current input voltage $V_I$ is applied to one end of the primary winding of a transformer 930, and the other end of the primary winding is connected to a transistor 911. A primary-side control IC 910 feeds a pulse signal to the gate of the transistor 911 to drive the switching of the transistor 911. One end of the secondary winding of the transformer 930 is connected to an output terminal at which the output voltage $V_O$ of the DC-DC converter 901 is to appear, and the other end of the secondary winding is connected to the drain of a synchronous rectification transistor 921. The source of the synchronous rectification transistor 921 is connected to a secondary-side ground. A secondary-side control IC 920 controls the turning on and off of the synchronous rectification transistor 921 based on, for example, the drain voltage $V_{D921}$ of the synchronous rectification transistor 921.

FIG. 22 is a timing chart of the DC-DC converter 901. During an on-period of the transistor 911, while a primary-side current is flowing, a voltage higher than the output voltage $V_O$ is applied to the drain of the synchronous rectification transistor 921. When the transistor 911 turns off, the drain voltage $V_{D921}$ of the synchronous rectification transistor 921 falls sharply, and a secondary-side current flows via a parasite diode 922 of the synchronous rectification transistor 921. When, based on the secondary-side current flowing via the diode 922, the secondary-side control IC 920 detects the drain voltage $V_{D921}$ having fallen below a predetermined negative turn-on threshold voltage (for example, −100 mV), the synchronous rectification transistor 921 is turned on.

After the synchronous rectification transistor 921 turns on, the secondary-side current flows via the channel of the synchronous rectification transistor 921, and the magnitude of the secondary-side current decreases as the energy stored in the transformer 930 decreases. As the magnitude of the secondary-side current decreases, when the drain voltage $V_{D921}$ is detected having risen above a predetermined negative turn-off threshold voltage (for example, −12 mV), the synchronous rectification transistor 921 is turned off. After the synchronous rectification transistor 921 turns off, the secondary-side current flows via the parasite diode 922.

Through the operation described above, a large part of the secondary-side current can be passed via the channel of the synchronous rectification transistor 921, and this helps achieve higher efficiency than with diode rectification.

In the secondary-side control IC 920, if, for the sake of discussion, the secondary-side discharge time (the time for which the secondary-side current flows) were known, the synchronous rectification transistor 921 could be kept in the on state only for the secondary-side discharge time. In reality, however, the secondary-side control IC 920 cannot directly know the secondary-side discharge time, and thus the secondary-side control IC 920 so operates that, after the synchronous rectification transistor 921 turns on, when the magnitude of the drain voltage $V_{D921}$ rises to a voltage close to zero, the secondary-side control IC 920 regards discharging on the secondary side close to its end and turns off the synchronous rectification transistor 921.

However, even if the secondary-side discharge time is constant, the peak value of the secondary-side current varies depending on the input voltage $V_I$, the inductance value of the secondary winding, the output voltage $V_O$, and the turns ratio of the transformer 930. As the peak value of the secondary-side current varies, as shown in FIG. 23, the turn-off time point of the synchronous rectification transistor 921 varies widely, and this destabilizes the characteristics of the DC-DC converter 901 (note that, after the transistor 921 is turned off, the drain voltage $V_{D921}$ oscillates in free resonance; this behavior, however, is omitted from illustration in FIG. 23, and the same applies to FIG. 24, which will be referred to later).

Even if the peak value of the secondary-side current is constant, the secondary-side discharge time varies depending on the output voltage $V_O$. As the secondary-side discharge time varies, as shown in FIG. 24, the turn-off time point of the synchronous rectification transistor 921 varies widely, and this destabilizes the characteristics of the DC-DC converter 901.

Furthermore, the parasite inductance component of the package of the synchronous rectification transistor 921 may affect the turn-off time point of the synchronous rectification transistor 921. Moreover, in a design where the drain voltage $V_{D921}$, which is the product of the on-resistance of the synchronous rectification transistor 921 multiplied by the secondary-side current, is compared with a minute turn-off threshold voltage, it is difficult to reduce the on-resistance.

On the other hand, a gate driving device drives the gate of a target transistor (such as a power transistor) configured as a MOSFET or the like (see, for example, Patent Document 2 identified below). A gate driving device often keeps the gate voltage of a target transistor constant by connecting a pull-down resistor to the gate of the target transistor in order to prevent the target transistor from turning on before the circuit in the gate driving device starts up.

With the above configuration, a current flows through the resistor even after the circuit has started up, and thus power is wasted.

CITATION LIST

Patent Document 1: Japanese Patent Application published as No. 2016-163438

Patent Document 2: Japanese Patent Application published as No. 2002-136115

SUMMARY OF THE INVENTION

An object of the present invention is to provide a synchronous rectification controlling device that contributes to stable characteristics of an isolated synchronous-rectification DC-DC converter, and to provide an isolated synchronous-rectification DC-DC converter, an AC-DC converter, a power adapter, and an electric appliance employing such a synchronous rectification controlling device.

Another object of the present invention is to provide a gate driving device that contributes to reduction of power consumption, and to provide an isolated DC-DC converter, an AC-DC converter, a power adapter, and an electric appliance employing such a gate driving device.

According to one aspect of the present invention, a synchronous rectification controlling device that controls a synchronous rectification transistor arranged on the secondary side in a flyback isolated synchronous-rectification DC-DC converter includes a turn-on control circuit configured to turn on the synchronous rectification transistor in response to a switching transistor connected to the primary winding of a transformer in the DC-DC converter turning off, and a turn-off control circuit configured to control the turning-off of the synchronous rectification transistor. Here, the turn-off control circuit is configured, in the on-period of the switching transistor, to generate an on-period signal commensurate with the magnitude of an induced voltage appearing in the secondary winding of the transformer and the length of the on-period, and, after the synchronous rectification transistor turns on, to determine the turn-off time point of the synchronous rectification transistor based on the on-period signal and the output voltage of the DC-DC converter. (A first configuration.)

In the synchronous rectification controlling device according to the first configuration described above, preferably, the turn-off control circuit is configured, in the on-period of the switching transistor, to generate a current commensurate with the magnitude of the induced voltage appearing in the secondary winding of the transformer and thereby generate a signal commensurate with the value of the current and the length of the on-period as the on-period signal. (A second configuration.)

In the synchronous rectification controlling device according to the second configuration described above, preferably, the turn-off control circuit has a capacitor and is configured to generate the on-period signal across the capacitor in the on-period of the switching transistor by passing the current via the capacitor. (A third configuration.)

In the synchronous rectification controlling device according to the third configuration described above, preferably, the current is a first current, and the turn-off control circuit is configured, in the off-period of the switching transistor, to pass via the capacitor a second current which flows in the direction opposite to the first current and which is commensurate with the output voltage of the DC-DC converter and to turn off the synchronous rectification transistor when the voltage across the capacitor reaches a predetermined voltage. (A fourth configuration.)

In the synchronous rectification controlling device according to the fourth configuration described above, preferably, the synchronous rectification controlling device has a first terminal receiving a division voltage, produced by a first voltage dividing circuit, of the voltage appearing at the connection node between the secondary winding and the synchronous rectification transistor and a second terminal receiving a division voltage of the output voltage produced by a second voltage dividing circuit, the turn-off control circuit has a first resistor and a second resistor and is configured, in the on-period of the switching transistor, to pass via the capacitor as the first current the difference current between a current that depends on the first resistor and the voltage at the first terminal and a current that depends on the second resistor and the voltage at the second terminal and, in the off-period of the switching transistor, to pass via the capacitor in the direction opposite to the first current as the second current the current that depends on the second resistor and the voltage at the second terminal. (A fifth configuration.)

In the synchronous rectification/controlling device according to the fifth configuration described above, preferably, the voltage division ratio of the first voltage dividing circuit and the voltage division ratio of the second voltage dividing circuit are equal to each other, and the resistance value of the first resistor and the resistance value of the second resistor are equal to each other. (A sixth configuration.)

In the synchronous rectification controlling device according to the third configuration described above, preferably, the capacitor is a first capacitor, the turn-off control circuit further has a second capacitor separately from the first capacitor, and the turn-off control circuit is configured, in the off-period of the switching transistor, to pass via the second capacitor a current commensurate with the output voltage of the DC-DC converter and to turn off the synchronous rectification transistor when the voltage across the second capacitor reaches the voltage of the on-period signal. (A seventh configuration.)

In the synchronous rectification controlling device according to any one of the first to seventh configurations described above, preferably, the synchronous rectification controlling device is formed as a semiconductor integrated circuit. (An eighth configuration.)

According to another aspect of the present invention, a flyback isolated synchronous-rectification DC-DC converter includes a transformer having a primary winding and a secondary winding, a switching transistor connected to the primary winding, a synchronous rectification transistor connected to the secondary winding, a primary-side control circuit configured to control the turning on and off of the switching transistor, and a secondary-side control circuit configured to control the turning on and off of the synchronous rectification transistor. Here, the synchronous rectification controlling device according to any one of the first to eight configurations described above is used as the secondary-side control circuit. (A ninth configuration.)

According to another aspect of the present invention, an AC-DC converter includes a rectification circuit configured to perform full-wave rectification on an alternating-current voltage, a smoothing capacitor configured to smooth the full-wave rectified voltage to thereby generate a direct-current voltage, and the isolated synchronous-rectification DC-DC converter according to the ninth configuration described above generating a direct-current output voltage from an input voltage as the direct-current voltage. (A tenth configuration.)

According to another aspect of the present invention, a power adapter includes a plug receiving an alternating-current voltage, the AC-DC converter according to the tenth configuration, and a housing in which the AC-DC converter is housed. (An eleventh configuration.)

According to another aspect of the present invention, an electric appliance includes the AC-DC converter according to the tenth configuration described above, and a load driven based on the output voltage of the AC-DC converter. (A twelfth configuration.)

According to another aspect of the present invention, a gate driving device includes a main control circuit configured to generate a drive control signal, and a drive circuit connected to the gate of a target transistor via a gate line and configured to drive the gate of the target transistor based on the drive control signal from the main control circuit. Here, the gate driving device further includes a series circuit composed of a resistor and a switch and inserted in series between the gate line and a predetermined potential point, and a sub control circuit configured to turn on the switch before the main control circuit starts up and to turn off the switch after the main control circuit has started up. (A thirteenth configuration.)

In the gate driving device according to the thirteenth configuration described above, preferably, the impedance of the drive circuit as seen from the gate line is higher before the main control circuit starts up than after the main control circuit has started up. (A fourteenth configuration.)

In the gate driving device according to the thirteenth or fourteenth configuration described above, preferably, the drive circuit has a first transistor and a second transistor connected in series with each other, a direct-current driving voltage is applied to the series circuit composed of the first and second transistors, and the connection node between the first and second transistors is connected to the gate line. Preferably, after the main control circuit has started up, one of the first and second transistors is on based on the drive control signal, and before the main control circuit starts up, the first and second transistors are both off. (A fifteenth configuration.)

In the gate driving device according to any one of the thirteenth to fifteenth configurations described above, preferably, the gate driving device further includes a power terminal receiving a supply voltage and an internal power supply circuit configured to generate an internal supply voltage based on the supply voltage received, and the main control circuit starts up a predetermined preparation time after receiving the internal supply voltage. (A sixteenth configuration.)

In the gate driving device according to any one of the thirteenth to sixteenth configurations described above, preferably, the target transistor is a switching transistor connected to the primary winding of a transformer in an isolated DC-DC converter. (A seventeenth configuration.)

In the gate driving device according to the sixteenth configuration described above, preferably, the target transistor is a switching transistor connected to the primary winding of a transformer in an isolated DC-DC converter, and the supply voltage is generated based on the input voltage to the DC-DC converter as applied to one end of the primary winding. (An eighteenth configuration.)

In the gate driving device according to ally one of the thirteenth to eighteenth configurations described above, preferably, the gate driving device is formed as a semiconductor integrated circuit. (A nineteenth configuration.)

According to another aspect of the present invention, an isolated DC-DC converter includes a transformer having a primary winding and a secondary winding, a switching transistor connected to the primary winding, and a primary-side control circuit configured to control the turning on and off of the switching transistor, and the isolated DC-DC converter generates an output voltage on the secondary side of the transformer from an input voltage applied to the primary winding. Here, preferably, the gate driving device according to any one of the thirteenth to sixteenth configurations is used as the primary-side control circuit, and the gate driving device drives switching of the switching transistor as the target transistor. (A twentieth configuration.)

According to another aspect of the present invention, an AC-DC converter includes a rectification circuit configured to perform full-wave rectification on an alternating-current voltage, a smoothing capacitor configured to smooth the full-wave rectified voltage to thereby generate a direct-current voltage, and the isolated DC-DC converter according to the twentieth configuration described above generating a direct-current output voltage from an input voltage as the direct-current voltage. (A twenty-first configuration.)

According to another aspect of the present invention, a power adapter includes a plug receiving an alternating-current voltage, the AC-DC converter according to the twenty-first configuration described above, and a housing in which the AC-DC converter is housed. (A twenty-second configuration.)

According to another aspect of the present invention, an electric appliance includes the AC-DC converter according to the twenty-first configuration described above, and a load driven based on the output voltage of the AC-DC converter. (A twenty-third configuration.)

According to the present invention, it is possible to provide a synchronous rectification controlling device that contributes to stable characteristics of an isolated synchronous-rectification DC-DC converter, and to provide an isolated synchronous-rectification DC-DC converter, an AC-DC converter, a power adapter, and an electric appliance employing such a synchronous rectification controlling device.

Or, according to the present invention, it is possible to provide a gate driving device that contributes to reduction of power consumption, and to provide an insulated DC-DC converter, an AC-DC converter, a power adapter, and an electric appliance employing such a gate driving device.

DETAILED DESCRIPTION OF PREFERRED EMBODIMENTS

Hereinafter, examples embodying the present invention will be described specifically with reference to the accompanying drawings. Among the diagrams referred to, the same parts are identified by the same reference signs, and in principle no overlapping description of the same parts will be repeated. In the present description, for the sake of simple description, symbols and other designations referring to information, signals, physical quantities, components, and the like are occasionally used with the names of the corresponding information, signals, physical quantities, components, and the like omitted or abbreviated. For example, although a switching transistor described later and identified by the reference symbol "M1" (see FIG. 1) is mentioned as "switching transistor M1" at some places and is abbreviated to "transistor M1" at other places, these and similar designations all refer to the same component.

First, some terms used to describe embodiments will be defined. A level denotes the level of a potential, and with respect to a given signal or voltage, high level has a higher potential than low level. With respect to any signal or voltage that switches periodically between high and low levels, the proportion of the length of the period in which the level of the signal or voltage is high level to the length of the period corresponding to one cycle of the signal or voltage is referred to as the duty ratio.

With respect to a given transistor configured as an FET (field-effect transistor), an on state denotes that the drain-source channel of the transistor is in a conducting state, and an off state denotes that the drain-source channel of the transistor is in a non-conducting (cut-off) state. A given switch is configured with one or more FETs (field-effect transistors). When a switch is on, there is conduction between the two ends of the switch, and when a switch is off, there is no conduction between the two ends of the switch. In the following description, with respect to a given transistor or switch, its being in an on or off state is often described simply as being on or off, respectively. With respect to a given transistor or switch, its switching from an off state to an on state is described as turning on, and its switching from an on state to an off state is referred to as turning off.

First Embodiment

Figure 1:
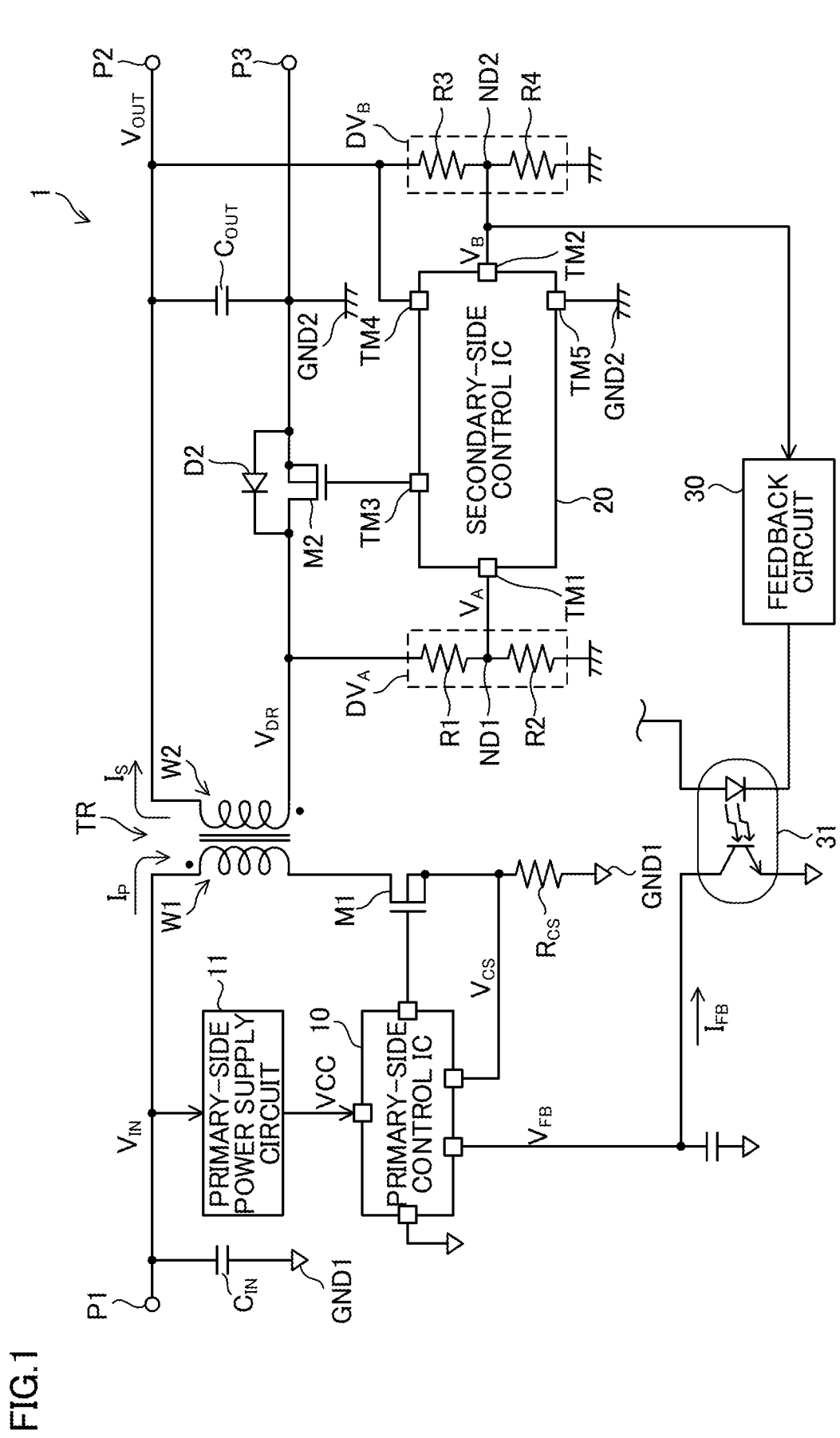
FIG. 1 is an overall configuration diagram of a DC-DC converter according to a first embodiment of the present invention.

A first embodiment of the present invention will be described. FIG. 1 is an overall configuration diagram of an isolated synchronous-rectification DC-DC converter 1 (hereinafter also referred to simply as the DC-DC converter 1) according to the first embodiment of the present invention. The DC-DC converter 1 is a flyback DC-DC converter, and generates, from a direct-current input voltage $V_{IN}$ applied to an input terminal P1, a direct-current output voltage $V_{OUT}$ stabilized at a desired target voltage $V_{TG}$.

The DC-DC converter 1 is composed of a primary-side circuit and a secondary-side circuit which are electrically isolated from each other. The ground in the primary-side circuit is represented by "GND1" and the ground in the secondary-side circuit is represented by "GND2". In each of the primary-side and secondary-side circuits, the ground refers to a conductive part at a reference potential of 0 V (zero volts), or refers to the reference potential itself. Being isolated from each other, the ground GND1 and the ground GND2 can have different potentials.

The DC-DC converter 1 includes a pair of output terminals P2 and P3, of which the output terminal P3 is connected to the ground GND2, and, as seen from the potential at the output terminal P3 (that is, the potential of the ground GND2), the output voltage $V_{OUT}$ is applied to the output terminal P2. The DC-DC converter 1 can supply the output voltage $V_{OUT}$ to any load (not shown) connected between the output terminals P2 and P3.

The DC-DC converter 1 includes a transformer TR having a primary winding W1 and a secondary winding W2. In the transformer TR, the primary and secondary windings W1 and W2 are electrically isolated from each other, but are magnetically coupled with each other with opposite polarities.

The primary-side circuit of the DC-DC converter 1 includes, in addition to the primary winding W1, a primary-side control IC 10 as a primary-side control circuit, a primary-side power supply circuit 11, an input capacitor $C_{IN}$, a switching transistor M1, and a sense resistor $R_{CS}$. The switching transistor M1 is configured as an N-channel MOSFET (metal-oxide-semiconductor field-effect transistor). The primary-side control IC 10 is configured as a semiconductor integrated circuit. One end of the primary winding W1 is connected to the input terminal P1 to receive the direct-current input voltage $V_{IN}$. The other end of the primary winding W1 is connected to the drain of the switching transistor M1, and the source of the switching transistor M1 is connected to the ground GND1 via the sense resistor $R_{CS}$. The input capacitor $C_{IN}$ is provided between the input terminal P1 and the ground GND1, and the input voltage $V_{IN}$ is applied across the input capacitor $C_{IN}$. The primary-side power supply circuit 11 performs DC-DC conversion on the input voltage $V_{IN}$ to thereby generate a supply voltage VCC having a desired voltage value, and supplies the supply voltage VCC to the primary-side control IC 10. The primary-side control IC 10 operates based on the supply voltage VCC.

The secondary-side circuit of the DC-DC converter 1 includes, in addition to the secondary winding W2, a secondary-side control IC 20 as a secondary-side control circuit, a feedback circuit 30, a synchronous rectification transistor M2, a diode D2, voltage dividing resistors R1 to R4, and an output capacitor $C_{OUT}$. The secondary-side control IC 20 is configured as a semiconductor integrated circuit. The voltage dividing resistors R1 and R2 constitute a voltage dividing circuit $DV_A$, and the voltage dividing resistors R3 and R4 constitute a voltage dividing circuit $DV_B$. The synchronous rectification transistor M2 (hereinafter also referred to as the SR transistor M2) is configured as an N-channel MOSFET. The diode D2 is a parasite diode of the SR transistor M2. Thus, the diode D2 is connected in parallel with the SR transistor M2 with the forward direction of the diode D2 pointing from the source to the drain of the SR transistor M2. The diode D2 may be a diode provided separately from the parasite diode.

One end of the secondary winding W2 is connected to the output terminal P2, and thus to the one end of the secondary winding W2, the output voltage $V_{OUT}$ is applied. The other end of the secondary winding W2 is connected to the drain of the SR transistor M2. The voltage at the other end of the secondary winding W2 (in other words, the drain voltage of the SR transistor M2) is represented by "$V_{DR}$". The connection node between the other end of the secondary winding W2 and the drain of the SR transistor M2 is connected to one end of the voltage dividing resistor R1, and the other end of the voltage dividing resistor R1 is connected to the ground GND2 via the voltage dividing resistor R2. Thus, to the connection node ND1 between the voltage dividing resistors R1 and R2, a division voltage $V_A$ is applied that results from the division of the voltage $V_{DR}$ by the voltage dividing circuit $DV_A$. In the following description, the resistance values of the voltage dividing resistors R1 and R2 will also be represented by "R1" and "R2", respectively. Then, the division voltage $V_A$ (in other words, the voltage obtained by dividing the voltage $V_{DR}$ with the voltage dividing circuit $DV_A$) is given by "$V_A = V_{DR} \times R2/(R1+R2)$".

On the other hand, the output terminal P2, to which the output voltage $V_{OUT}$ is applied, is connected to one end of the voltage dividing resistor R3, and the other end of the voltage dividing resistor R3 is connected to the ground GND2 via the voltage dividing resistor R4. Thus, to the connection node ND2 between the voltage dividing resistors R3 and R4, a division voltage $V_B$ is applied that results front the division of the output voltage $V_{OUT}$ by the voltage dividing circuit $DV_B$. In the following description, the resistance values of the voltage dividing resistors R3 and R4 will also be represented by "R3" and "R4", respectively. Then, the division voltage $V_B$ (in other words, the voltage obtained by dividing the output voltage $V_{OUT}$ with the voltage dividing circuit $DV_B$) is given by "$V_B = V_{OUT} \times R4/(R3+R4)$".

The voltage division ratio in the voltage dividing circuit $DV_A$ is set to be equal to the voltage division ratio in the voltage dividing circuit $DV_B$. That is, the resistance values of the voltage dividing resistors R1 to R4 are determined such that "R1:R2=R3:R4" holds.

The source of the SR transistor M2 is connected to the ground GND2. The output capacitor $C_{OUT}$ is provided between the output terminals P2 and P3, and the output voltage $V_{OUT}$ is applied across the output capacitor $C_{OUT}$. A resistor for detecting an overcurrent may be provided between the output capacitor $C_{OUT}$ and the load (not shown) of the DC-DC converter 1.

Figure 2:
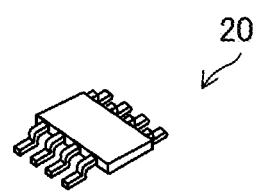
FIG. 2 is an exterior perspective view of the secondary-side control IC shown in FIG. 1.

FIG. 2 shows an example of the exterior appearance of the secondary-side control IC 20. The secondary-side control IC 20 is an electronic component (semiconductor device) produced by enclosing a semiconductor integrated circuit in a resin housing (package), and the circuits constituting the secondary-side control IC 20 are integrated together using semiconductor elements. The housing of the electronic component as the secondary-side control IC 20 is provided with a plurality of external terminals exposed outside the IC 20. The number of external terminals shown in FIG. 2 is merely illustrative. The primary-side control IC 10 has a structure similar to that of the secondary-side control IC 20 shown in FIG. 2.

As part of the plurality of external terminals provided in the secondary-side control IC 20, external terminals TM1 to TM5 are shown in FIG. 1. The external terminal TM1 is connected to the node ND1 to receive the voltage $V_A$, and the external terminal TM2 is connected to the node ND2 to receive the voltage $V_B$. The external terminal TM3 is connected to the gate of the SR transistor M2. The external terminal TM4 is connected to the output terminal P2 to receive the output voltage $V_{OUT}$. The circuits in the secondary-side control IC 20 operate based on the output voltage $V_{OUT}$. The external terminal TM5 is connected to the ground GND2.

The secondary-side control IC 20 controls the gate voltage of the SR transistor M2 based on the voltages $V_A$ and $V_B$ to thereby control the turning on and off of the SR transistor M2. This control method will be described in detail later.

In the DC-DC converter 1, a photocoupler 31 is provided to bridge between the primary-side and secondary-side circuits. The photocoupler 31 has a light emitting element arranged in the secondary-side circuit and a light sensing element arranged in the primary-side circuit. The light emitting element of the photocoupler 31 is biased with the output voltage $V_{OUT}$ or with a division voltage of the output voltage $V_{OUT}$, and the feedback circuit 30 drives the light emitting element of the photocoupler 31 such that the output voltage $V_{OUT}$ follows the desired target voltage $V_{TG}$. For example, as shown in FIG. 1, the feedback circuit 30 is connected to the node ND2 and, based on the division voltage $V_B$ of the output voltage $V_{OUT}$, supplies a current commensurate with the error between the output voltage $V_{OUT}$ and the target voltage $V_{TG}$ to the light emitting element of the photocoupler 31. The feedback circuit 30 is configured as a shunt regulator, an error amplifier, or the like.

The primary-side control IC 10 is connected to the light sensing element of the photocoupler 31, so that a feedback signal $V_{FB}$ commensurate with a feedback current which flows through the light sensing element of the photocoupler 31 is fed to the primary-side control IC 10. Also, a current detection signal $V_{CS}$ corresponding to the voltage drop across the sense resistor $R_{CS}$ is fed to the primary-side IC 10.

The primary-side control IC 10 is connected to the gate of the switching transistor M1, and feeds a pulse signal to the gate of the switching transistor M1 to thereby drive the switching of the switching transistor M1. The pulse signal is a signal with a rectangular waveform of which the signal level switches between low level and high level. When the gate of the transistor M1 is fed with a low-level signal or a high-level signal, the transistor M1 is in the off state or in the on state, respectively. There are no particular restrictions on the configuration of, or on the control method for, the primary-side control IC 10. For example, the primary-side control IC 10 may use PWM modulation (pulse width modulation) to feed a pulse signal with a duty ratio commensurate with the feedback signal $V_{FB}$ to the gate of the switching transistor M1, or may use PFM modulation (pulse frequency modulation) to feed a pulse signal with a frequency commensurate with the feedback signal $V_{FB}$ to the gate of the switching transistor M1. For another example, the primary-side control IC 10 may be a current-mode modulator. In that case, for example, the duty ratio of the pulse signal fed to the gate of the switching transistor M1 is adjusted in accordance with the current detection signal $V_{CS}$.

Instead of the primary-side power supply circuit 11 being provided, a subsidiary winding may be provided in the transformer TR such that the supply voltage for the primary-side control IC 10 is generated in a self power supply circuit configured around the subsidiary winding.

In the primary-side circuit, the current flowing from the input terminal P1 via the primary winding W1 to the ground GND1 is represented by the symbol "$I_P$". In the secondary-side circuit, the current flowing from the ground GND2 via the secondary winding W2 to the output terminal P2 is represented by the symbol "$I_S$". The currents $I_P$ and $I_S$ are occasionally referred to also as the primary-side current and the secondary-side current, respectively.

Figure 3:
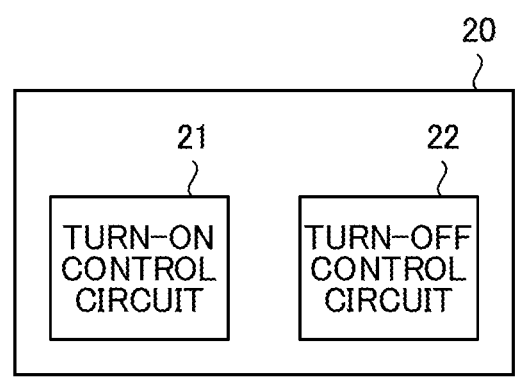
FIG. 3 is an outline block diagram of the secondary-side control IC shown in FIG.

As shown in FIG. 3, the secondary-side control IC 20 is provided with a turn-on control circuit 21, which determines the turn-on time point of the SR transistor M2 and which turns on the SR transistor M2, and a turn-off control circuit 22, which determines the turn-off time point of the SR transistor M2 and which turns off the SR transistor M2. In addition to these circuits, the secondary-side control IC 20 may be provided further with an overvoltage protection circuit, an overheat protection circuit, and the like; however, the following description focuses on the functions of the control circuits 21 and 22.

Figure 4:
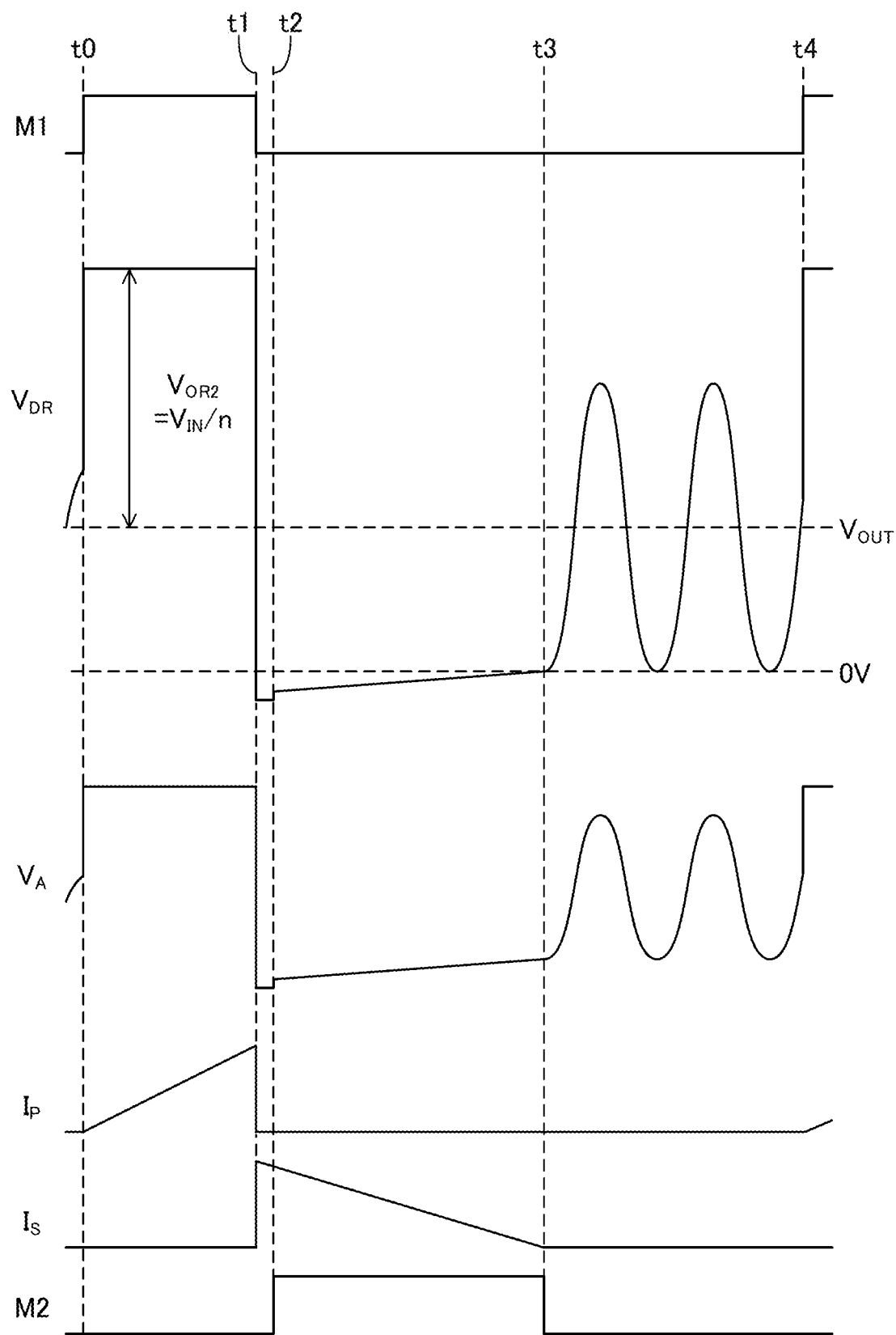
FIG. 4 is timing chart of a DC-DC converter according to the first embodiment of the present invention.

FIG. 4 is a timing chart of the DC-DC converter 1 in a discontinuous mode.

Under the control of the primary-side control IC 10, the switching transistor M1 is kept in the an state during the period between time points t0 and t1 and is then kept in the off state during the period up to time point t4. With respect to a given transistor, a period during which the transistor is in the on state will be referred to as an on-period, and a period during which the transistor is in the off state will be referred to as an off-period. During the on-period of the switching transistor M1, the SR transistor M2 is in the off state. Likewise, during the on-period of the SR transistor M2, the switching transistor M1 is in the off state.

During the on-period of the switching transistor M1, the current $I_P$ flows through the primary winding W1, and the voltage $V_{DR}$ on the secondary side is higher than the output voltage $V_{OUT}$ by a voltage $V_{OR2}$. The voltage $V_{OR2}$ is an induced voltage that appears in the secondary winding W2 during the on-period of the switching transistor M1. The induced voltage $V_{OR2}$ can be given, using the input voltage $V_{IN}$ and the turns ratio n of the transformer TR, by "$V_{OR2}=V_{IN}/n$". Here, the turns ratio n is given by "$n=N_P/N_S$", where $N_P$ represents the number of turns in the primary winding W1 and $N_S$ represents the number of turns in the secondary winding W2.

When, at time point t1, the switching transistor M1 turns off, the voltages $V_{DR}$ and $V_A$ fall sharply, and the secondary-side current $I_S$ flows via the diode D2. When, as a result, the turn-on control circuit 21 detects the voltage $V_{DR2}$ having fallen below a predetermined negative turn-on threshold voltage (for example, −100 mV), the turn-on control circuit 21 turn on the SR transistor M2. In practice, this detection is performed based on the voltage $V_A$. That is, in response to the voltage $V_A$ falling below a predetermined negative voltage corresponding to the turn-on threshold voltage, the turn-on control circuit 21 detects the switching transistor M1 having turned off, and in response to the switching transistor M1 turning off, the turn-on control circuit 21 turns on the SR transistor M2. Time point t2 is a turn-on time point of the SR transistor M2.

After the SR transistor M2 turns on, the secondary-side current $I_S$ flows via the cannel of the SR transistor M2, and the magnitude of the secondary-side current $I_S$ decreases as the energy stored in the transformer TR decreases.

After time point t2, at time point t3, the turn-off control circuit 22 turns off the SR transistor M2. How the turn-off control circuit 22 determines the turn-off time point t3 will be described in detail later. After time point t3, until time point t4, the transistors M1 and M2 are both in the off state, and the voltage $V_{DR}$ oscillates in free resonance. Then, under the control of the primary-side control IC 10, the switching transistor M1 turns on at time point t4. Thereafter, similar operation is performed repeatedly.

In the operation described above, if the turn-off time point t3 can be set at a time point at which the secondary side current $I_S$ becomes just equal to zero without depending on the peak value of the secondary side current $I_S$ or the secondary-side discharge time (that is, the time for which the secondary side current $I_S$ flows), that helps stabilize the characteristics of the DC-DC converter 1 and optimize efficiency. The turn-off control circuit 22 has a function of recognizing the secondary-side discharge time, and can, with an error ignored, make the SR transistor M2 turn off at a time point at which the secondary side current $I_S$ becomes just equal to zero.

Before a description of a specific configuration of the turn-off control circuit 22, formulae relating to the secondary-side discharge time will be studied.

First, as already mentioned above, between the input voltage $V_{IN}$ and the voltage $V_{OR}$, there is a relationship expressed by formula (I) below, and the turns ratio n is given by formula (2) below.

$$V_{IN} = V_{OR2} \times n \quad (1)$$

$$n = \frac{N_P}{N_S} \quad (2)$$

When the peak current value (maximum current value) of the primary-side current $I_P$ is represented by "$I_{PPK}$", and the peak current value (maximum current value) of the secondary side current $I_S$ is represented by "$I_{SPK}$", the peak current values $I_{PPK}$ and $I_{SPK}$ can be expressed by formulae (3) and (4), respectively, below. The peak current value $I_{SPK}$ can be expressed also by formula (5) below. Here, "$t_{ON}$" represents the length of the on-period (on-time) of the switching transistor M1 in one unit period, and $t'_{OFF}$ represents the secondary-side discharge time in one unit period. The switching transistor M1 turns on and off alternately, and the sum of one on-period and one off-period following the one on-period of the switching transistor M1 is referred to as "one unit period". $L_S$ represents the inductance value of the secondary winding W2.

$$I_{PPK} = \frac{V_{IN}}{L_P} \times t_{ON} \quad (3)$$

$$I_{SPK} = I_{PPK} \times n \quad (4)$$

$$I_{SPK} = \frac{V_{OUT}}{L_S} \times t'_{OFF} \quad (5)$$

Based on relational formula (6) expressing the relationship between the inductance value $L_S$ of the secondary winding W2 and the inductance value $L_P$ of the primary winding W1, by using formulae (1), (3), and (4), formula (5) can be rearranged to formula (7) below, and formula (7) can be rearranged to formula (8).

$$L_S = \frac{L_P}{n^2} \quad (6)$$

$$\frac{V_{OR_2} \times n^2}{L_P} \times t_{ON} = \frac{V_{OUT}}{\frac{L_P}{n^2}} \times t'_{OFF} \quad (7)$$

$$V_{OR2} \times t_{ON} = V_{OUT} \times t'_{OFF} \quad (8)$$

Here, multiplying both sides of formula (8) by "1/CR" gives formula (9) below. The symbols "C" and "R" in formula (9) represent the capacitance value and the resistance value of a capacitor and a resistor, respectively, provided in the turn-off control circuit 22, of which the details will become clear from the circuit configuration of the turn-off control circuit 22 described later.

$$\frac{V_{OR_2}}{R \times C} \times t_{ON} = \frac{V_{OUT}}{R \times C} \times t'_{OFF} \quad (9)$$

Rearranging the left side of formula (9) based on formula (10) below results in formula (9) being rearranged to formula (11) below. Thus, the secondary-side discharge time $t'_{OFF}$ is given by formula (12) below.

$$V_{PRI} = \frac{V_{OR_2}}{R \times C} \times t_{ON} = \frac{I_{PRI} \times t_{ON}}{C} \quad (10)$$

$$V_{PRI} = \frac{V_{OUT}}{R \times C} \times t'_{OFF} \quad (11)$$

$$= \frac{V_{OUT}}{R} \times \frac{1}{C} \times t'_{OFF}$$

$$= I_{SEC} \times \frac{1}{C} \times t'_{OFF} = \frac{I_{SEC}}{C} \times t'_{OFF}$$

$$t'_{OFF} = \frac{V_{PRI} \times C}{I_{SEC}} = \frac{\frac{V_{OR_2}}{R \times C} \times t_{ON} \times C}{\frac{V_{OUT}}{R}} \quad (12)$$

That is, the secondary-side discharge time $t'_{OFF}$ can be estimated by using "$V_{OR2}$", "$t_{ON}$", and "$V_{OUT}$" observable on the secondary side, and the turn-off control circuit 22 can determine the turn-off time point of the SR transistor M2 such that the SR transistor M2 is kept on only for the secondary-side discharge time $t'_{OFF}$.

Figure 5:
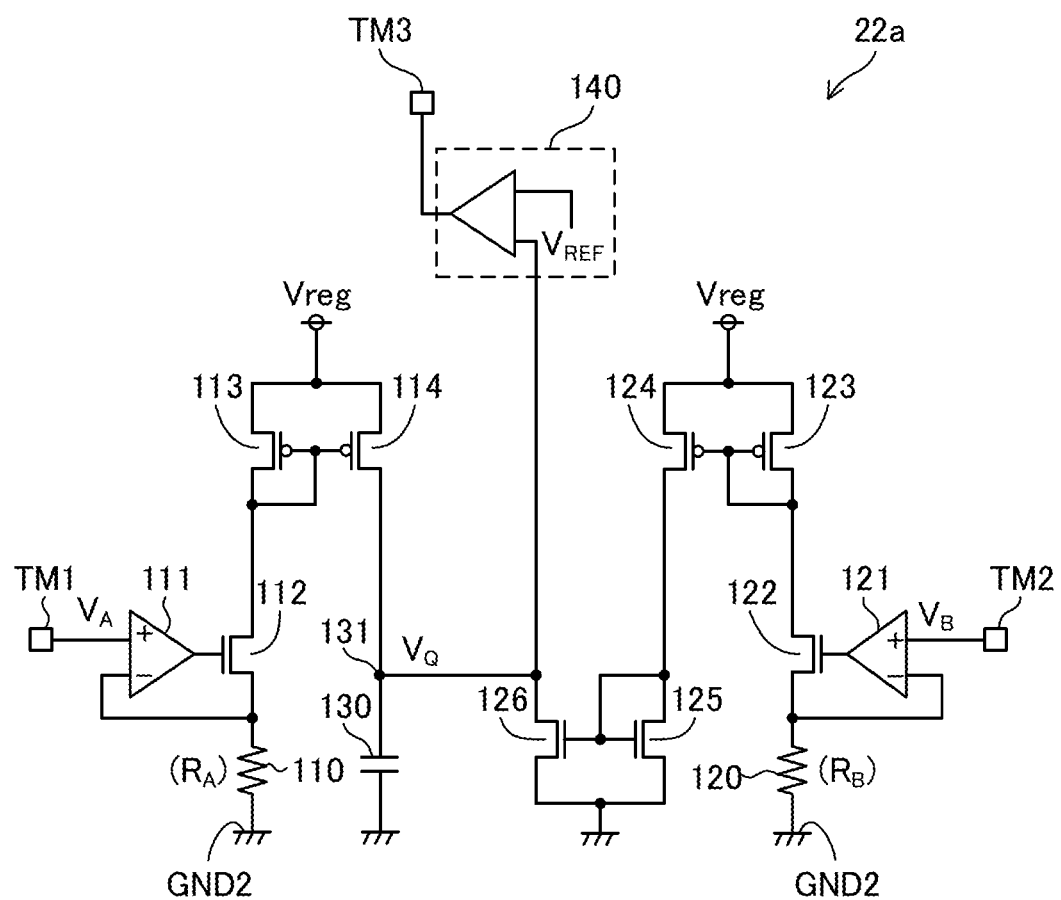
FIG. 5 is a circuit diagram of a turn-off control circuit according to the first embodiment of the present invention.

FIG. 5 shows a turn-off control circuit 22a as an example of the turn-off control circuit 22. The turn-off control circuit 22a includes an analog circuit for deriving the secondary-side discharge time $t'_{OFF}$ based on formula (12) above. Note that the following description assumes that a voltage mentioned with no specific reference given is a voltage relative to the potential of the ground GND2, and that, unless otherwise noted, 0 V (zero volts) refers to the potential of the ground GND2.

The turn-off control circuit 22a includes resistors 110 and 120, operational amplifiers 111 and 121, transistors 112 to 114 and 122 to 126, a capacitor 130, and a gate signal generation circuit 140. The transistors 112, 122, 125, and 126 are configured as N-channel MOSFETs, and the transistors 113, 114, 123, and 124 are configured as P-channel MOSFETs.

A description will now be given of the circuit configuration of the turn-off control circuit 22a. The non-inverting input terminal of the operational amplifier 111 is connected to the terminal TM1 to receive the voltage $V_A$. The inverting input terminal of the operational amplifier 111 is connected to the source of the transistor 112, and is connected also to the ground GND2 via the resistor 110. The output terminal of the operational amplifier 111 is connected to the gate of the transistor 112. To the sources of the transistors 113 and 114, a predetermined internal supply voltage Vreg is applied. The internal supply voltage Vreg is a predetermined positive direct-current voltage generated within the secondary-side control IC 20 based on the voltage $V_{OUT}$. The gate and the drain of the transistor 113, the gate of the transistor 114, and the drain of the transistor 112 are connected together.

The drain of the transistor 114 is connected to a node 131. The node 131 is connected to one end of the capacitor 130, and the other end of the capacitor 130 is connected to the ground GND2. The voltage at the node 131, that is, the voltage across the capacitor 130, is represented by "$V_Q$".

The non-inverting input terminal of the operational amplifier 121 is connected to the terminal TM2 to receive the voltage $V_B$. The inverting input terminal of the operational amplifier 121 is connected to the source of the transistor 122, and is connected also to the ground GND2 via the resistor 120. The output terminal of the operational amplifier 121 is connected to the gate of the transistor 122. To the sources of the transistors 123 and 124, the predetermined internal supply voltage Vreg is applied. The gate and the drain of the transistor 123, the gate of the transistor 124, and the drain of the transistor 122 are connected together.

The drain of the transistor 124, the gate and the drain of the transistor 125, and the gate of the transistor 126 are connected together. The sources of the transistors 125 and 126 are connected to the ground GND2. The drain of the transistor 126 is connected to the node 131. The node 131 is connected to the gate signal generation circuit 140.

Now, the operation of the turn-off control circuit 22a will be described. In the following description, the resistance values of the resistors 110 and 120 will be represented by "$R_A$" and "$R_B$", respectively. In this embodiment, also the value itself of the voltage $V_A$ is occasionally represented by the symbol "$V_A$", and when focus is on the value itself of the voltage $V_A$, it is occasionally referred to as "the voltage value $V_A$" (the same applies to $V_B$, $V_Q$, $V_{IN}$, $V_{OUT}$, etc.).

Figure 6:
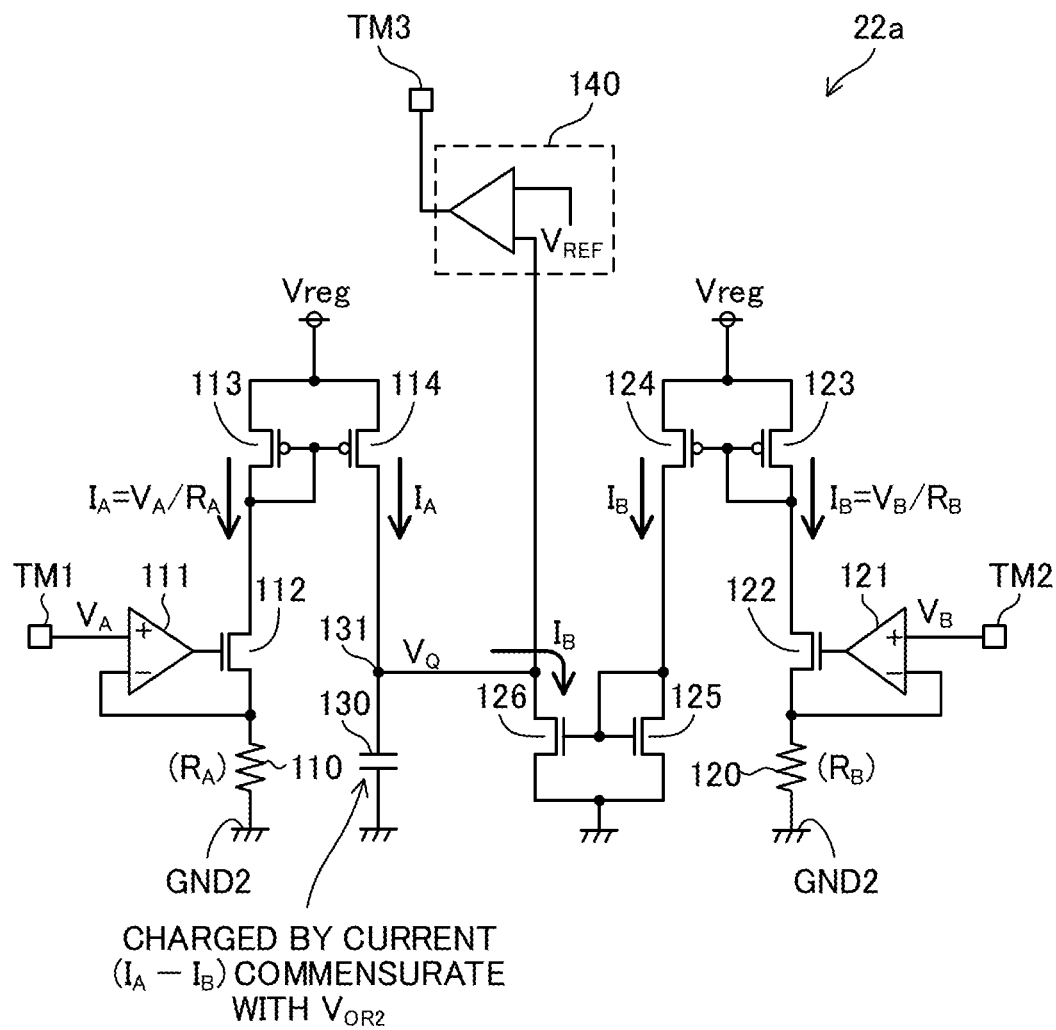
FIG. 6 is a diagram showing the flow of currents inside a turn-off control circuit during an on-period of a primary-side switching transistor in the first embodiment of the present invention.

FIG. 6 shows the flow of currents in the turn-off controlling circuit 22a during an on-period of the switching transistor M1. The on-period of the switching transistor M1 corresponds to the period between time points t0 and t1 in FIG. 4. During the on-period the switching transistor M1, a division voltage of the voltage ($V_{OUT}+V_{OR2}$) is applied as the voltage $V_A$ to the non-inverting input terminal of the operational amplifier 111. As a result, by the function of the operational amplifier 111, a current $I_A$ given by "$V_A/R_A$" flows through transistors 113 and 112; thus, by the function of a current mirror circuit composed of the transistors 113 and 114, the current $I_A$ flows via the transistor 114 toward the node 131. On the other hand, regardless of the state of the transistors M1 and M2, a division voltage of the output voltage $V_{OUT}$ is applied as the voltage $V_B$ to the non-inverting input terminal of the operational amplifier 121. As a result, by the function of the operational amplifier 121, a current $I_B$ given by "$V_B/R_B$" flows through the transistors 123 and 122; thus, by the function of a current mirror circuit composed of the transistors 123 and 124, the current $I_B$ flows via the transistor 124 toward the transistor 125; thus, by the function of a current mirror circuit composed of the transistors 125 and 126, the current $I_B$ flows from the node 131 toward the transistor 126.

The current $I_A$ flows in such a direction as to raise the voltage across the capacitor 130, and the current $I_B$ flows in such a direction as to lower the voltage across the capacitor 130. Here, the voltage division ratio in the voltage dividing circuit $DV_A$ and the voltage division ratio in the voltage dividing circuit $DV_B$ are set to be equal to each other as described above, and in addition, the resistance values $R_A$ and $R_B$ of the resistors 110 and 120 are also set to be equal to each other. Thus, in the on-period of the switching transistor M1, "$I_A > I_B$" holds, and the capacitor 130 keeps being charged by a current $(I_A - I_B)$. Since the current $I_A$, which is given by "$V_A/R_A$", is proportional to the voltage $(V_{OUT}+V_{OR2})$, and the current $I_B$, which is given by "$V_B/R_B$", is proportional to the voltage $V_{OUT}$, the difference current $(I_A - I_B)$ between the currents $I_A$ and $I_B$ is a current that is proportional to the magnitude of the induced voltage $V_{OR2}$ appearing in the secondary winding W2 during the on-period of the switching transistor M1. That is, during the on-period of the switching transistor M1, the capacitor 130 keeps being charged by a current that is proportional to the induced voltage $V_{OR2}$ (and thus a current that is proportional to the input voltage $V_{IN}$). Note that the circuit configuration does not allow charging to proceed until the voltage $V_Q$ exceeds the internal supply voltage Vreg. The constants of the relevant circuit elements and the value of the voltage Vreg are designed such that the voltage $V_Q$ never reaches the voltage Vreg during the on-period of the switching transistor M1.

Figure 7:
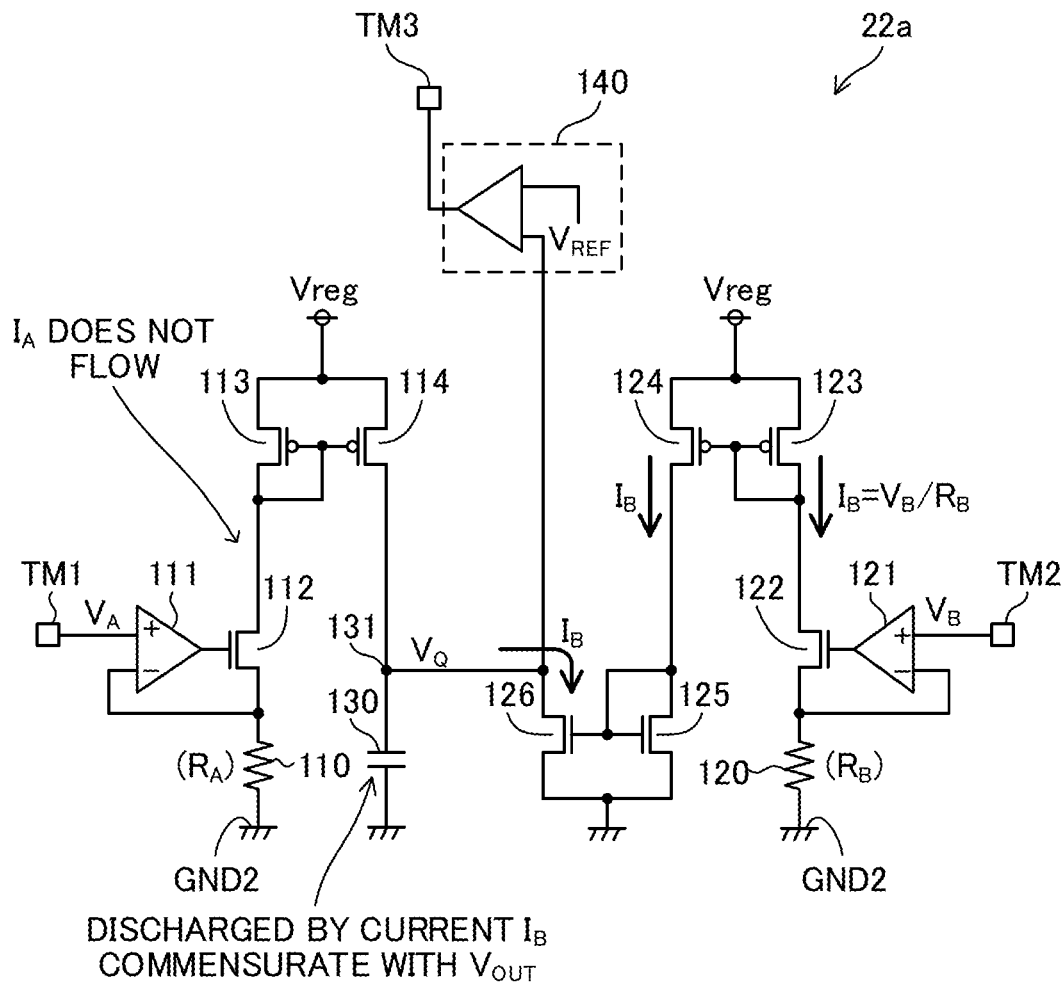
FIG. 7 is a diagram showing the flow of currents inside a turn-off control circuit during an off-period of a primary-side switching transistor in the first embodiment of the present invention.

FIG. 7 shows the flow of currents in the turn-off controlling circuit 22a during the period within the off-period of the switching transistor M1 before the SR transistor M2 is turned off. The period within the off-period of the switching transistor M1 before the SR transistor M2 is turned off corresponds to the period between time points t1 and t3 in FIG. 4.

During the period between time points t1 and t3, the voltage $V_A$ is equal to or lower than the potential of the ground GND2 and thus the current $I_A$ does not flow, but the current $I_B$ flows as during the on-period of the switching transistor M1, and thus the capacitor 130 is discharged by the current $I_B$. The current $I_B$, which is given by "$V_B/R_B$", is proportional to the voltage $V_{OUT}$, and thus during the period between time points t1 and t3, the capacitor 130 keeps being discharged by a current proportional to the voltage $V_{OUT}$. Here, the lower limit of the fall of the voltage $V_Q$ resulting from the discharging, is 0 V. After time point t1, the gate signal generation circuit 140 generates the gate signal for the SR transistor M2 based on the voltage $V_Q$ at the node 131, and thereby turns off the SR transistor M2 at a time point appropriate according to the voltage $V_Q$.

Figure 8:
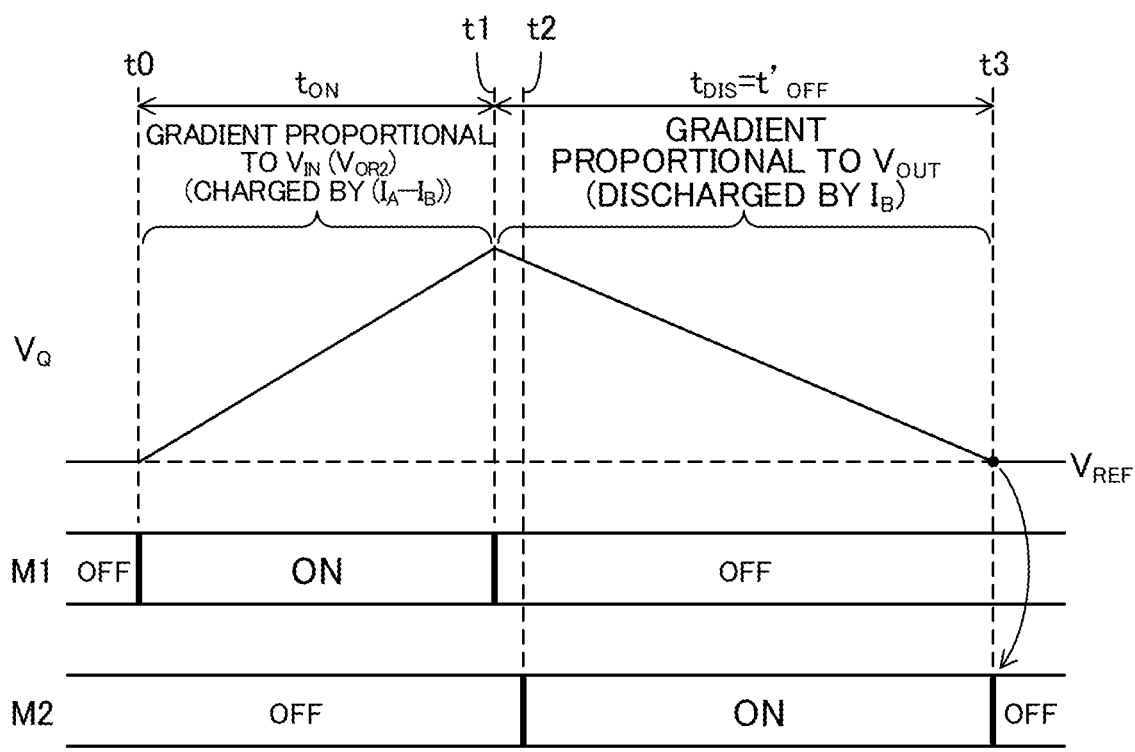
FIG. 8 is a timing chart related to a turn-off control circuit in the first embodiment of the present invention.

FIG. 8 is a timing chart related to the turn-off control circuit 22a. In the period between time points t0 and t1, during which the switching transistor M1 is in the on state, the voltage $V_Q$ keeps rising with a gradient proportional to the input voltage $V_{IN}$ (that is, with a gradient proportional to the voltage $V_{OR2}$). After the switching transistor M1 turns off until the SR transistor M2, after being turned on, is turned off (that is, between time points t1 and t3), the voltage $V_Q$ keeps falling with a gradient proportional to the output voltage $V_{OUT}$.

After the SR transistor M2 is turned on by the turn-on control circuit 21, the gate signal generation circuit 140 compares the voltage $V_Q$ with a predetermined reference voltage $V_{REF}$, and at a time point that the voltage $V_Q$ falls to or below the reference voltage $V_{REF}$, the gate signal generation circuit 140 feeds a low-level gate signal to the gate of the SR transistor M2 to turn off the SR transistor M2. From then on until the turn-on control circuit 21 turns on the SR transistor M2 the next time, the SR transistor M2 is kept in the off state. The gate signal generation circuit 140 can be configured as a comparator that compares the voltage $V_Q$ with the reference voltage $V_{REF}$.

After the SR transistor M2 is turned off, until the switching transistor M1 turns on the next time, the drain voltage $V_{DR}$ of the SR transistor M2 stays in free resonance around the output voltage $V_{OUT}$ (see FIG. 4); thus, the voltage $V_Q$ across the capacitor 130 also oscillates in sync around the reference voltage $V_{REF}$. Here, the direct-current component of the voltage $V_Q$ across the capacitor 130 in a period during which the switching transistors M1 and M2 are both off can be regarded as equal to the reference voltage $V_{REF}$. Thus, at the turn-on time point t0 of the switching transistor M1, the voltage $V_Q$ can be regarded as equal to the reference voltage $V_{REF}$ (for the convenience of illustration, FIG. 8 assumes that the voltage $V_Q$ is exactly equal to the reference voltage $V_{REF}$ before time point t0 and after time point t3).

Then, between time points t0 and t1, electric charge proportional to the product "$V_{OR2} \times t_{ON}$" is stored in the capacitor 130, and the thus stored electric charge is discharged just between time points t1 and t3. When the time between time points t1 and t3 is represented by "$t_{DIS}$", the electric charge discharged between time points t1 and t3 is proportional to the product "$V_{OUT} \times t_{DIS}$". Further, since the voltage dividing circuits $DV_A$ and $DV_B$ are given equal voltage division ratios, and also the resistance values $R_A$ and $R_B$ are set to be equal to each other, "$V_{OR2} \times t_{ON} = V_{OUT} \times t_{DIS}$" holds.

The time $t_{DIS}$ between time points t1 and t3, as is clear from formula (8) above, equals the secondary-side discharge time $t'_{OFF}$. That is, with the turn-off control circuit 22a, it is possible to set, as the turn-off time point t3, a time point at which the secondary side current $I_S$ becomes just equal to zero.

Figure 21:
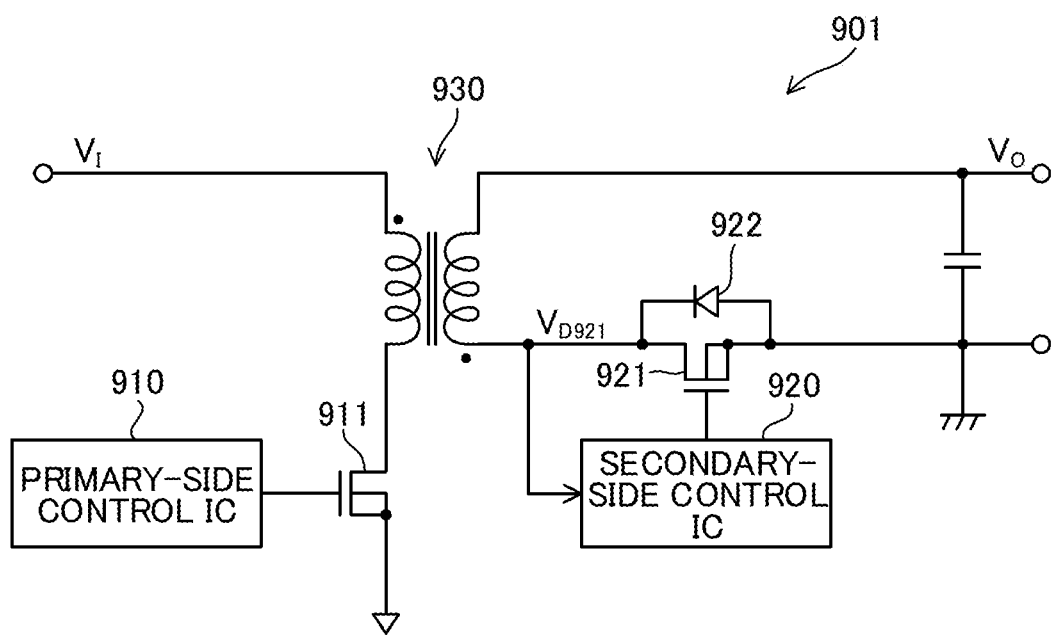
FIG. 21 is an outline configuration diagram of a common isolated synchronous-rectification DC-DC converter.
Figure 22:
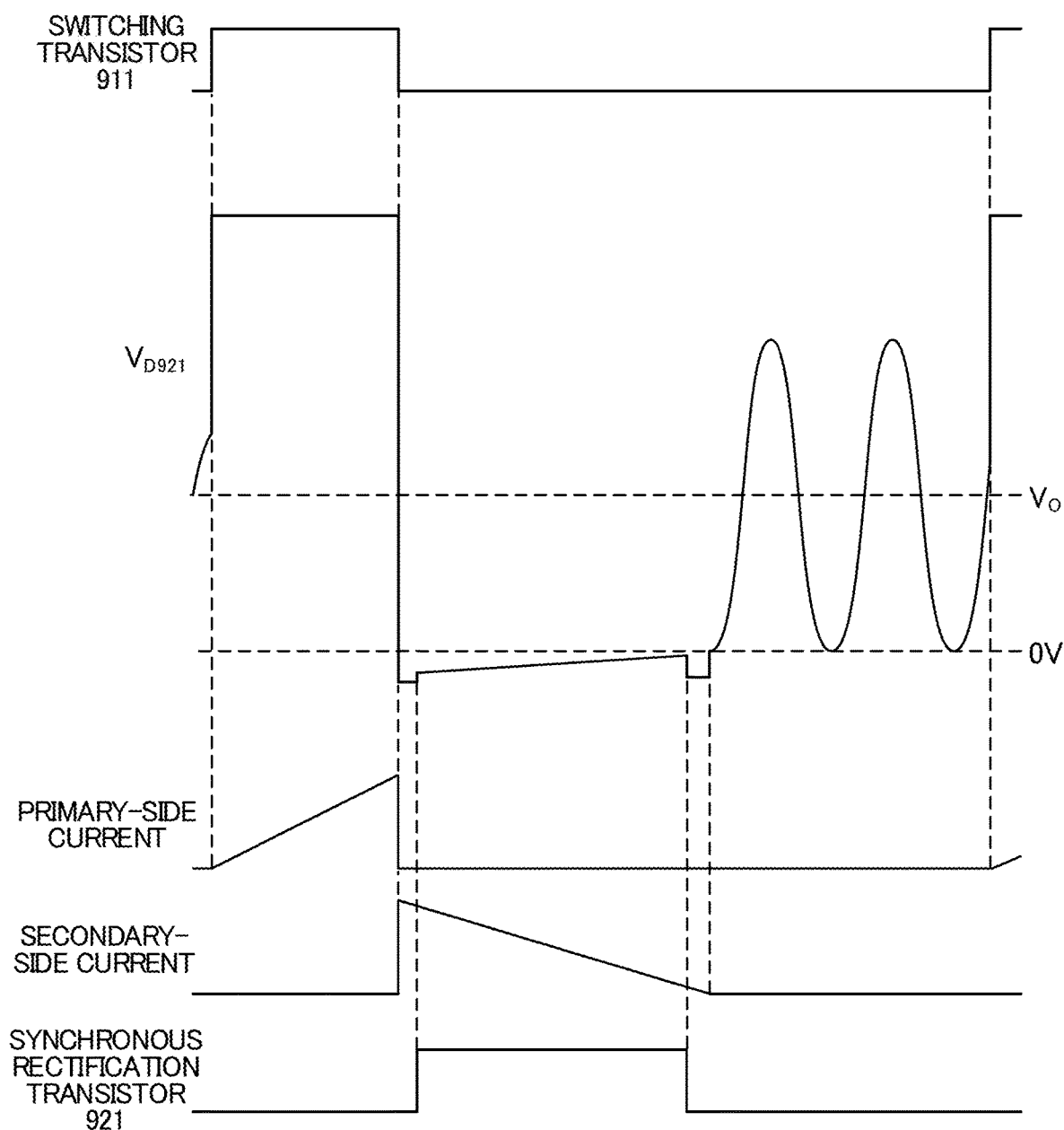
FIG. 22 is a timing chart of the DC-DC converter shown in FIG. 21.
Figure 23:
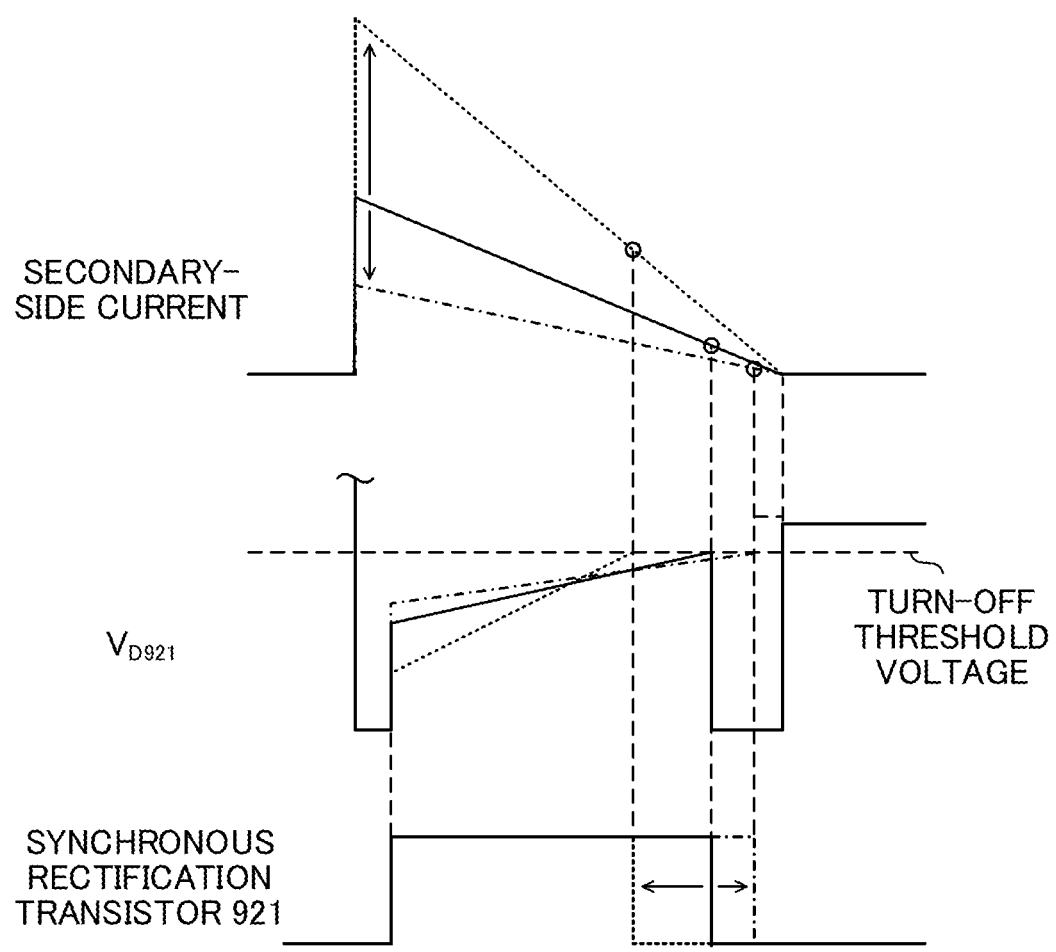
FIG. 23 is a diagram showing a response to a change of the peak value of a secondary-side current in the DC-DC converter shown in FIG. 21.
Figure 24:
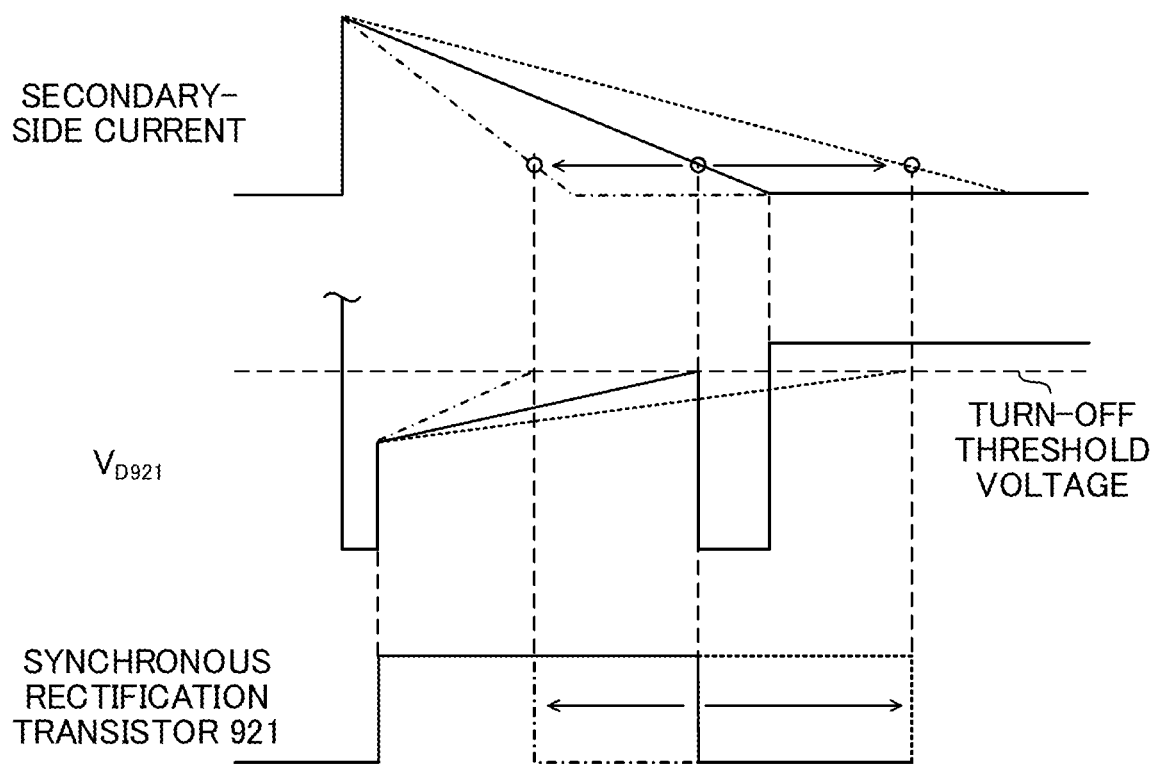
FIG. 24 is a diagram showing a response to a change of a secondary-side discharge time in the DC-DC converter shown in FIG. 21.

This helps stabilize the characteristics of the DC-DC converter 1 and optimize efficiency without depending on the voltages $V_{IN}$ and $V_{OUT}$, etc. and the like (as mentioned earlier, the characteristics of the secondary-side control IC 920 shown in FIG. 21 vary depending on the voltages $V_{IN}$ and $V_{OUT}$, etc.). Furthermore, the turn-off time point of the SR transistor M2 can be controlled without being affected by the parasite inductance component of the package of the SR transistor M2 (as mentioned earlier, the secondary-side control IC 920 is affected by the parasite inductance component of the package of the synchronous rectification transistor 921). Moreover, reducing the on-resistance of the SR transistor M2 does not pose a problem, and thus it is possible to reduce loss in the SR transistor M2 (as mentioned earlier, in the secondary-side control IC 920 shown in FIG. 21, it is difficult to reduce the on-resistance of the synchronous rectification transistor 921). Further, even though the inductance value of the transformer TR has production variations, so long as the turns ratio n is managed appropriately, it is possible to set a proper turn-off time point of the SR transistor M2 without being affected by production variations of the inductance value of the transformer TR. Moreover, the secondary-side control IC 20 does not receive the voltages $V_{DR}$ and $V_{OUT}$ directly but receives the division voltages $V_A$ and $V_B$ of the voltages $V_{DR}$ and $V_{OUT}$, and this helps lower the withstanding voltage required in the secondary-side control IC 20.

The turn-off control circuit 22 as exemplified by the turn-off control circuit 22a shown in FIG. 5 passes a current in a first direction via the capacitor 130 between time points t0 and t1, and passes a current in a second direction via the capacitor 130 between time points t1 and t3. The first and second directions are directions opposite to each other. In the turn-off control circuit 22a shown in FIG. 5, the first direction is a direction in which the capacitor 130 is charged, and the second direction is a direction in which the capacitor 130 is discharged.

In the on-period of the switching transistor M1, the turn-off control circuit 22 generates an on-period signal that is commensurate with the magnitude of the induction voltage ($V_{OR2}=V_{IN}/n$) appearing in the secondary winding 2 of the transformer TR and that is commensurate also with the length ($t_{on}$) of the on-period. The on-period signal is a signal corresponding to the left side of formula (8) above, and in the turn-off control circuit 22a shown in FIG. 5, the on-period signal (corresponding to $V_Q$ at time point t1) is generated across the capacitor 130. More specifically, the division voltage $V_A$ produced by the first voltage dividing circuit $DV_A$ and the division voltage $V_B$ produced by the second voltage dividing circuit $DV_B$ are received at the external terminals TM1 and TM2, respectively, and, in the on-period of the switching transistor M1, based on the division voltages $V_A$ and $V_B$, a current ($I_A-I_B$) commensurate with the magnitude of the induced voltage ($V_{OR2}=V_{IN}/n$) appearing in the secondary winding W2 of the transformer TR is generated. In the on-period of the switching transistor M1, from the current $I_A$ proportional to the voltage ($V_{OR2}+V_{OUT}$) and the current $I_B$ proportional to the voltage $V_{OUT}$, the current ($I_A-I_B$) commensurate with the magnitude of the induced voltage ($V_{OR2}=V_{IN}/n$) can be generated. In the on-period of the switching transistor M1, the current ($I_A-I_B$) is passed in the first direction via the capacitor 130, and thereby a signal commensurate with the value of the current ($I_A-I_B$) and the length ($t_{ON}$) of the on-period of the switching transistor M1 is generated across the capacitor 130 as the on-period signal (corresponding to $V_Q$ at time point t1). After the SR transistor M2 is turned on, the turn-off control circuit 22 determines the turn-off time point of the SR transistor M2 based on the above-described on-period signal and the output voltage $V_{OUT}$.

Specifically, in the off-period of the switching transistor M1, the turn-off control circuit 22 passes the current $I_B$ commensurate with the output voltage $V_{OUT}$ in the second direction via the capacitor 130, and when the voltage ($V_Q$) across the capacitor 130 reaches a predetermined voltage ($V_{REF}$), the turn-off control circuit 22 turns off the SR transistor M2. More specifically, for example, in the on-period of the switching transistor M1, the turn-off control circuit 22 passes, in the first direction via the capacitor 130, the difference current ($I_A-I_B$) between the current $I_A$ of which the current value depends on the voltage value $V_A$ and the resistance value $R_A$ and the current $I_B$ of which the current value depends on the voltage value $V_B$ and the resistance value $R_B$; then, in the off-period of the switching transistor M1, the turn-off control circuit 22 passes, in the second direction via the capacitor 130, the current $I_B$ of which the current value depends on the voltage value $V_B$ and the resistance value $R_B$. In the process of passing the current $I_n$ in the second direction, when the voltage ($V_Q$) across the capacitor 130 reaches the predetermined voltage ($V_{REF}$), the turn-off control circuit 22 turns off the SR transistor M2.

In a case where the first direction is the direction for charging the capacitor 130 and the second direction is the direction for discharging the capacitor 130, in the process of passing the current $I_B$ in the second direction, at a time point that the voltage ($V_Q$) across the capacitor 130 shills from above the predetermined voltage ($V_{REF}$) to equal to or below the predetermined voltage ($V_{REF}$), the turn-off control circuit 22 turns off the SR transistor M2.

Instead, the turn-off control circuit 22 may be configured (in other words, the turn-off control circuit 22a may be modified) such that the first direction is the direction for discharging the capacitor 130 and the second direction is the direction for charging the capacitor 130. In this case, in the process of passing the current $I_B$ in the second direction, at a time point that the voltage ($V_Q$) across the capacitor 130 shills from below the predetermined voltage ($V_{REF}$) to equal to or above the predetermined voltage ($V_{REF}$), the turn-off control circuit 22 can turn off the SR transistor M2.

A detection circuit (not shown) which detects the turn-on time point of the switching transistor M1 based on the drain voltage $V_{DR}$ of the SR transistor M2 may be provided in the secondary-side control IC 20 (for example, in the turn-off control circuit 22a). For example, on detecting the drain voltage $V_{DR}$ having risen to or above a predetermined threshold voltage, the detection circuit judges that the switching transistor M1 has turned on. This threshold voltage here is higher than a target voltage $V_{TG}$ determined with respect to the output voltage $V_{OUT}$ and is higher also than the maximum voltage which the drain voltage $V_{DR}$ is expected to reach in free resonance as mentioned above. In a case where such a detection circuit is provided, it is possible to provide the turn-off control circuit 22a with a forcing circuit (not shown) which forcibly makes the voltage $V_Q$ equal to the threshold voltage $V_{REF}$ during a period in which the transistors M1 and M2 are both off. During the period after the switching transistor M1 is detected tuning on until the SR transistor M2 is turned off, the forcing circuit is kept disconnected from the node 131 so as not to operate. With this configuration, in the on-period of the switching transistor M1, the voltage $V_Q$ reliably increases starting at the threshold voltage $V_{REF}$.

Second Embodiment

A second embodiment of the present invention will be described. The second embodiment, and also the third, sixth, and seventh embodiments described later, is an embodiment based on the first embodiment. Accordingly, for any feature of the second, third, sixth, and seventh embodiments of which no particular description is given, unless inconsistent, the corresponding description of the first embodiment may apply to the second, third, sixth, and seventh embodiments. Any feature of the second embodiment that is inconsistent with one of the first embodiment, the description of that feature of the second embodiment may prevail (the same applies to the second, third, sixth, and seventh embodiments described later). Unless inconsistent, any two or more of the first to third embodiments and the sixth and seventh embodiments described further on can be combined together, or any two or more of the first to seventh embodiments can be combined together.

In formula (9) above, "R" in the left side corresponds to the resistance value $R_A$, and "R" in the right side corresponds to the resistance value R. In the turn-off control circuit 22a shown in FIG. 5, a configuration is adopted in which the turn-off time point t3 is determined by using a single capacitor 130, and "C" in both sides of formula (9) correspond to the capacitance value of the capacitor 130.

It is also possible to configure the turn-off control circuit 22 by using two capacitors. That is, for example, a turn-off control circuit 22b as shown in FIG. 9 may be used as the turn-off control circuit 22.

Figure 9:
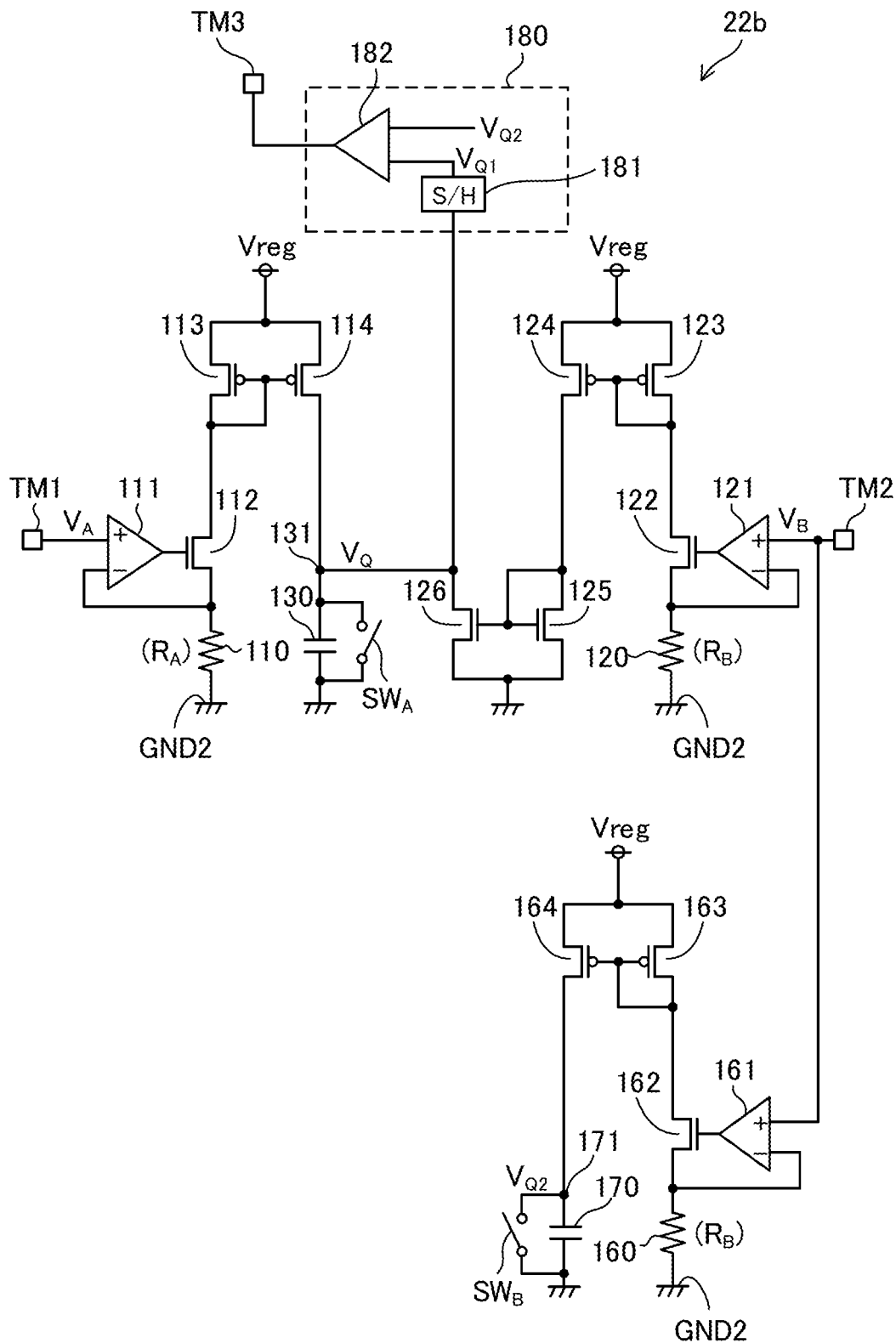
FIG. 9 is a circuit diagram of a turn-off control circuit according to a second embodiment of the present invention.

The turn-off control circuit 22b shown in FIG. 9 includes resistors 110 and 120, operational amplifiers 111 and 121, transistors 112 to 114 and 122 to 126, and a capacitor 130, and the interconnection among, and the operation of, these components are the same as in the turn-off control circuit 22a shown in FIG. 5. The turn-off control circuit 22b shown in FIG. 9 further includes a resistor 160, an operational amplifier 161, transistors 162 to 164, and a capacitor 170. The transistor 162 is configured as an N-channel MOSFET, and the transistors 163 and 164 are configured as P-channel MOSFETs. In formula (9) above, "C" in the left side corresponds to the capacitance value of the capacitor 130, and "C" in the right side corresponds to the capacitance value of the capacitor 170. The capacitance value of the capacitor 170 is set to be equal to that of the capacitor 130.

The non-inverting input terminal of the operational amplifier 161 is connected to the terminal TM2 to receive the voltage $V_B$. The inverting input terminal of the operational amplifier 161 is connected to the source of the transistor 162, and is connected also to the ground GND2 via the resistor 160. The output terminal of the operational amplifier 161 is connected to the gate of the transistor 162. To the sources of the transistors 163 and 164, the predetermined internal supply voltage Vreg is applied. The gate and the drain of the transistor 163, the gate of the transistor 164, and the drain of the transistor 162 are connected together.

The drain of the transistor 164 is connected, at a node 171, to one end of the capacitor 170. The other end of the capacitor 170 is connected to the ground GND2. The voltage at the node 171 is represented by "$V_{Q2}$". The resistor 160 is designed to have a resistance value equal to that of the resistor 120, and thus the resistance value of the resistor 160 is also represented by "$R_B$".

In the turn-off control circuit 22b, a switch $SW_A$ is provided in parallel with the capacitor 130, and a switch $SW_B$ is provided in parallel with the capacitor 170. The turn-off control circuit 22b controls the turning on and off of the switches $SW_A$ and $SW_B$. The turn-off control circuit 22b further includes, as a gate signal generation circuit, a gate signal generation circuit 180 having a sample-and-hold circuit 181 and a comparator 182. The sample-and-hold circuit 181 samples and holds the voltage $V_Q$ appearing at the node 131 at a predetermined time point as a voltage $V_{Q1}$. The comparator 182 feeds the SR transistor M2 with a gate signal commensurate with the result of comparison between the voltage $V_{Q1}$ and the voltage $V_{Q2}$ at the node 171.

Figure 10:
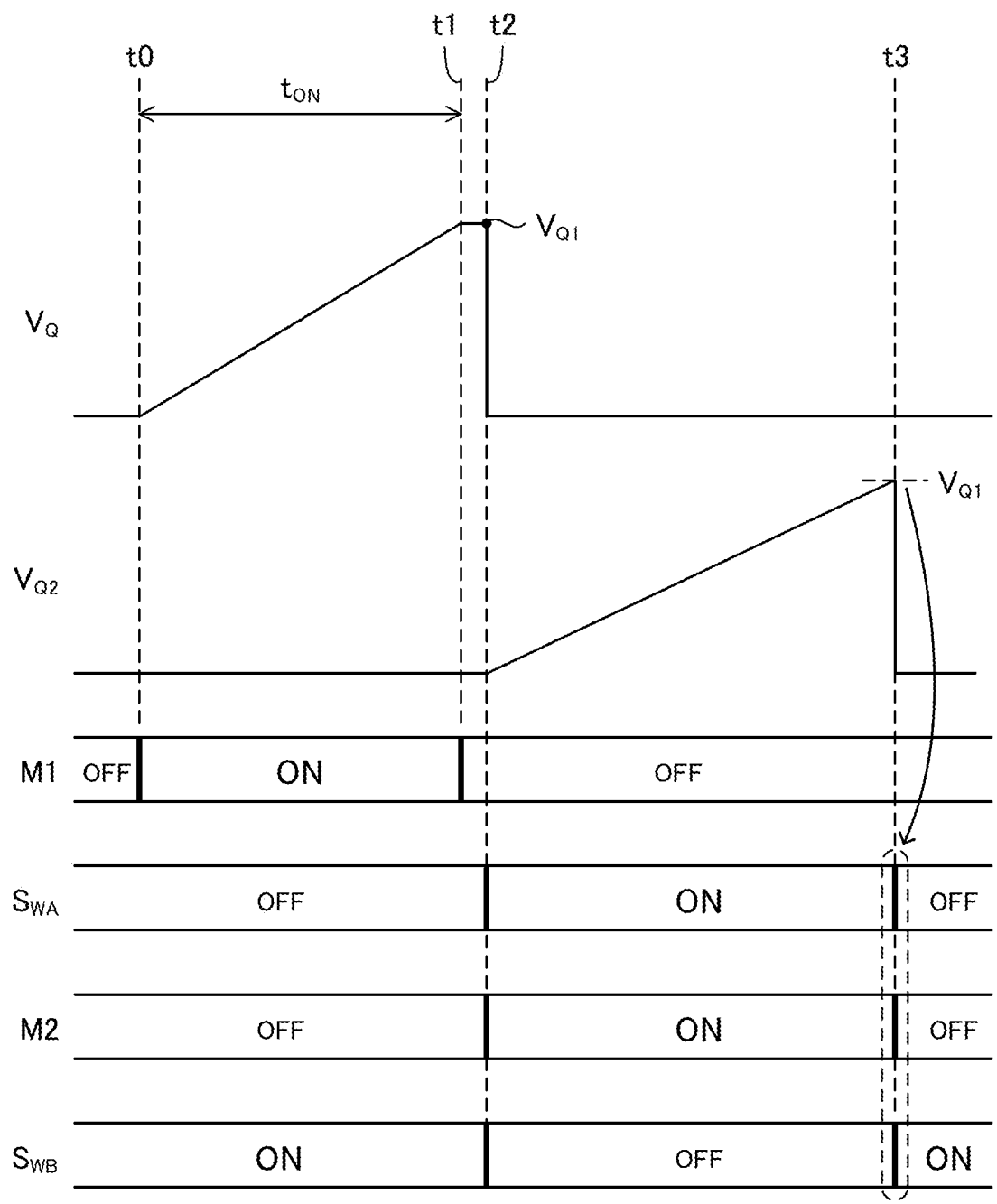
FIG. 10 is a timing chart related to a turn-off control circuit in the second embodiment of the present invention.

FIG. 10 is a timing chart related to the turn-off control circuit 22b. The switch $SW_A$ is off from before time point t0, and remains off between time points t0 and t1. Thus, as discussed in connection with the first embodiment, between time points t0 and t1 during which the switching transistor M1 is in the on state, the voltage $V_Q$ keeps rising with a gradient proportional to the input voltage $V_{IN}$ (that is, with a gradient proportional to the voltage $V_{OR2}$).

When the switching transistor M1 is turned off at time point t1, the drain voltage $V_{DR}$ of the SR transistor M2 falls sharply, and on detecting the voltage $V_{DR2}$ having fallen below a predetermined negative turn-on threshold voltage (for example, −100 mV), the turn-on control circuit 21 turns on the SR transistor M2 at time point t2. Here, immediately before turning on the SR transistor M2, in response to the detection of the voltage $V_{DR2}$ having fallen below the turn-on threshold voltage, the sample hold circuit 181 samples the voltage $V_Q$ at the node 131 and holds it as the voltage $V_{Q1}$. After the holding of the voltage $V_{Q1}$ ends, the switch $SW_A$ is turned on (in FIG. 10, the switch $SW_A$ is turned on at substantially the same time point as time point t2).

Before the SR transistor M2 is turned on, the switch $SW_B$ is in the on state so that the capacitor 170 is short-circuited across it, and thus the voltage $V_{Q2}$ is 0 V. The turn-off control circuit 22b turns off the switch $SW_B$ in sync with the turning on of the SR transistor M2. Then, in the period until the switch $SW_B$ is turned on the next time, the voltage $V_{Q2}$ keeps rising with a gradient proportional to the output voltage $V_{OUT}$.

After the SR transistor M2 is turned on, the comparator 182 compares the voltage $V_{Q1}$ with the voltage $V_{Q2}$, and at time point t3, at which the voltage $V_{Q2}$ reaches the voltage $V_{Q1}$, a low-level gate signal is fed to the gate of the SR transistor M2 so that the SR transistor M2 is turned off. From then on until the turn-on control circuit 21 turns on the SR transistor M2 the next time, the SR transistor M2 is kept off. The turn-off control circuit 22b turns off the switch $SW_A$ and turns on the switch $SW_B$ in sync with the turning off of the SR transistor M2.

After the SR transistor M2 is turned off until the switching transistor M1 is turned on the next time, the drain voltage $V_{DR}$ of the SR transistor M2 freely resonates around the output voltage $V_{OUT}$. Accordingly, after the switch $SW_A$ is turned off at time point t3, the voltage $V_Q$ at the capacitor 130 also oscillates in sync with the drain voltage $V_{DR}$; here, the charging current and the discharging current of the capacitor 130 in a period during which the transistors M1 and M2 are both on can be regarded as substantially equal to each other, and thus the voltage $V_Q$ across the capacitor 130 during that period can be regarded as zero. For convenience of illustration, FIG. 10 assumes that the voltage $V_Q$ in a period during which the transistors M1 and M2 are both on is a direct-current voltage of 0 V.

A detection circuit (not shown) which detects the turn-on time point of the switching transistor M1 based on the drain voltage $V_{DR}$ of the SR transistor M2 may be provided in the secondary-side control IC 20 (for example, in the turn-off control circuit 22b). For example, on detecting the drain voltage $V_{DR}$ having risen to or above a predetermined threshold voltage, the detection circuit judges that the switching transistor M1 has turned on. This threshold voltage is higher than a target voltage $V_{TG}$ determined with respect to the output voltage $V_{OUT}$ and is higher also than the maximum voltage of the drain voltage $V_{DR}$ which the drain voltage $V_{DR}$ is expected to reach by free resonance as mentioned above. In a case where such a detection circuit is provided, the switch $SW_A$ can be kept in the on state until the turning on of the switching transistor M1 is detected, and can be turned off in response to the detection of the turning on of the switching transistor M1 (the turn-on time point of the switch $SW_A$ thereafter is as described above). With this configuration, in the on-period of the switching transistor M1, the voltage $V_Q$ reliably increases starting at 0 V.

In any case, in the on-period of the switching transistor M1, the turn-off control circuit 22b generates a current $(I_A-I_B)$ commensurate with the magnitude $(V_{OR2}=V_{IN}/n)$ of the induced voltage appearing in the secondary winding W2 of the transformer TR and passes the current $(I_A-I_B)$ in the first direction via the capacitor 130 so that a signal commensurate with the value of the current $(I_A-I_B)$ and the length $(t_{ON})$ of the on-period of the switching transistor M1 is generated across the capacitor 130 as the on-period signal (corresponding to $V_Q$ at time point t1 and corresponding to $V_{Q1}$). In this regard, the second embodiment is similar to the first embodiment. Note that, in the off-period of the switching transistor M1, the turn-off control circuit 22b passes the current $I_B$ commensurate with the output voltage $V_{OUT}$ in the first direction via the capacitor 170 and turns off the SR transistor M2 when the voltage $(V_{Q2})$ across the capacitor 170 reaches the voltage $(V_{Q1})$ of the on-period signal.

Also this configuration provides effects similar to those achieved in the first embodiment. However, the turn-off time point of the SR transistor M2 deviates from the ideal time point by the amount of variation between the capacitance values of the capacitors 130 and 170. Thus, the first embodiment is preferable to the second embodiment.

In the second embodiment, the first direction mentioned above is the direction for charging the capacitors 130 and 170, but the turn-off control circuit 22b may be modified such that the first direction is the direction for discharging the capacitor 130 and 170.

Basically, it is preferable to design the capacitors 130 and 170 to have equal capacitance values, but it is also possible to give them different capacitance values. In that case, in accordance with the capacitance ratio between the capacitors 130 and 170, the resistance values $R_A$ and $R_B$ can be made different from each other or the voltage dividing circuits $DV_A$ and $DV_B$ can be given different voltage division ratios from each other.

Third Embodiment

A third embodiment of the present invention will be described. In the DC-DC converters 1 described in connection with the first and second embodiments, what is called a low-side application is adopted. In the DC-DC converter 1 of a flyback type, when a low-side application is adopted, as shown in FIG. 1, the SR transistor M2 is provided on the output terminal P3 side, and between the ground GND2 and the secondary winding W2 of the transformer TR, the SR transistor M2 is inserted in series.

Instead, in the DC-DC converter 1 according to the present invention, a high-side application may be adopted. When a high-side application is adopted in the DC-DC converter 1, the SR transistor M2 is provided on the output terminal P2 side, and between the output terminal P2, to which the output voltage $V_{OUT}$ is applied, and the secondary winding W2 of the transformer TR, the SR transistor M2 is inserted in series. It is possible to change in any other manner the position at which the SR transistor M2 is arranged in the secondary-side circuit in a manner that does not depart from the technical concept of the present invention.

Fourth Embodiment

Figure 11:
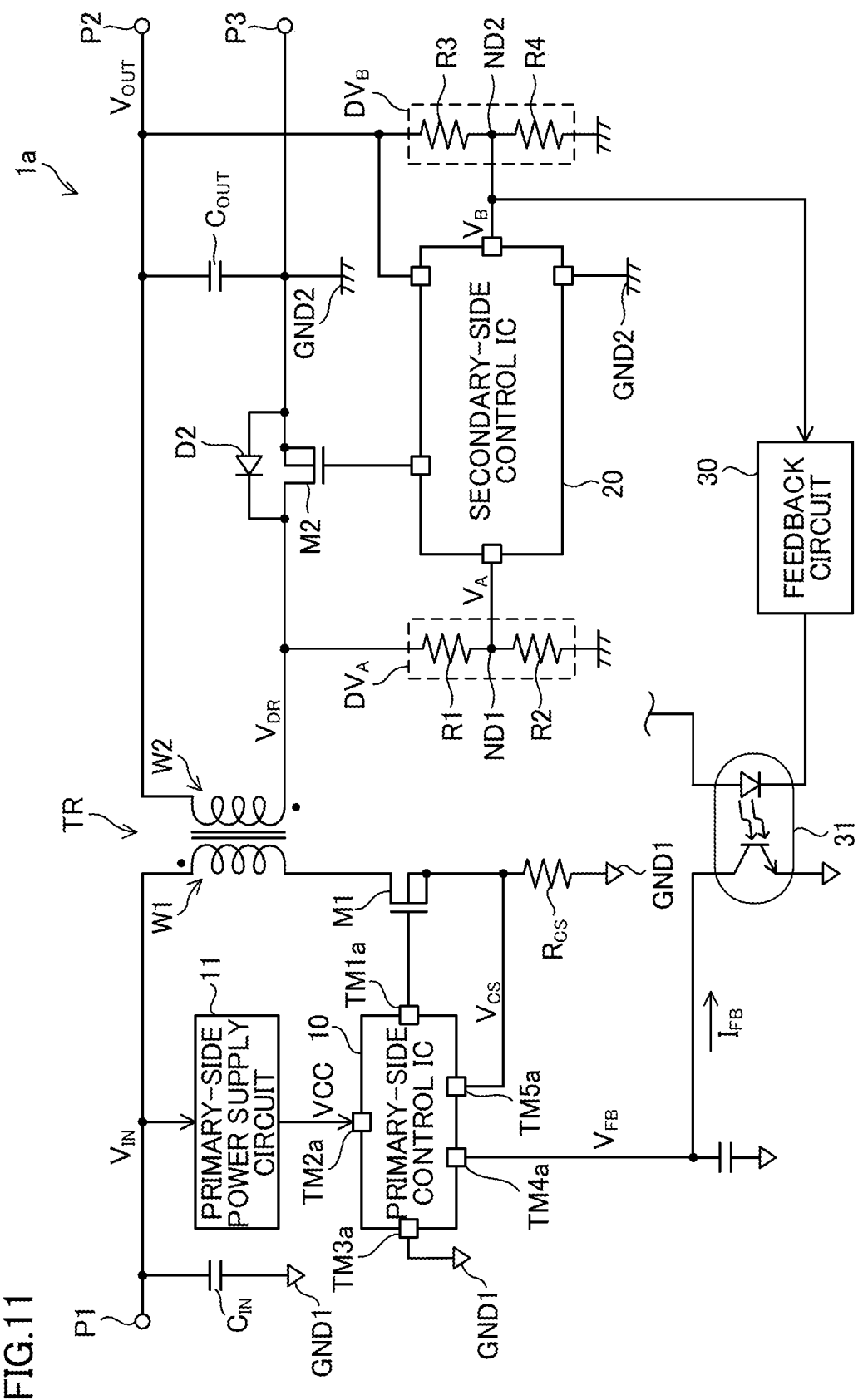
FIG. 11 is an overall configuration diagram of a DC-DC converter according to a fourth embodiment of the present invention.

A fourth embodiment of the present invention will be described. FIG. 11 is an overall configuration diagram of an isolated synchronous-rectification DC-DC converter 1a (hereinafter also referred to simply as the DC-DC converter 1a) according to the fourth embodiment of the present invention. The DC-DC converter 1a is a flyback DC-DC converter, and generates, from a direct-current input voltage $V_{IN}$ applied to an input terminal P1, a direct-current output voltage $V_{OUT}$ stabilized at a desired target voltage $V_{TG}$. The DC-DC converter 1a shown in FIG. 11 may have the same configuration as, or a configuration similar to that of, the DC-DC converter 1 shown in FIG. 1. The following description of the forth embodiment, while partly overlapping with the description given above of the DC-DC converter 1 shown in FIG. 1, will deal with the configuration and the operation of the DC-DC converter 1a.

The DC-DC converter 1a is composed of a primary-side circuit and a secondary-side circuit which are electrically isolated from each other. The ground in the primary-side circuit is represented by "GND1" and the ground in the secondary-side circuit is represented by "GND2". In each of the primary-side and secondary-side circuits, the ground refers to a conductive part at a reference potential of 0 V (zero volts) (that is, a predetermined-potential point), or refers to the reference potential itself. Being isolated from each other, the ground GND1 and the ground GND2 can have different potentials.

The DC-DC converter 1a includes a pair of output terminals P2 and P3, of which the output terminal P3 is connected to the ground GND2, and, as seen from the potential at the output terminal P3 (that is, the potential of the ground GND2), the output voltage $V_{OUT}$ is applied to the output terminal P2. The DC-DC converter 1a can supply the output voltage $V_{OUT}$ to any load (not shown) connected between the output terminals P2 and P3.

The DC-DC converter 1a includes a transformer TR having a primary winding W1 and a secondary winding W2. In the transformer TR, the primary and secondary windings W1 and W2 are electrically isolated from each other, but are magnetically coupled with each other with opposite polarities.

The primary-side circuit of the DC-DC converter 1a includes, in addition to the primary winding W1, a primary-side control IC 10 as a primary-side control circuit, a primary-side power supply circuit 11, an input capacitor $C_{IN}$, a switching transistor M1, and a sense resistor $R_{CS}$. The switching transistor M1 is configured as an N-channel MOSFET (metal-oxide-semiconductor field-effect transistor). The primary-side control IC 10 is configured as a semiconductor integrated circuit. One end of the primary winding W1 is connected to the input terminal P1 to receive the direct-current input voltage $V_{IN}$. The other end of the primary winding W1 is connected to the drain of the switching transistor M1, and the source of the switching transistor M1 is connected to the ground GND1 via the sense resistor $R_{CS}$. The input capacitor $C_{IN}$ is provided between the input terminal P1 and the ground GND1, and the input voltage $V_{IN}$ is applied across the input capacitor $C_{IN}$. The primary-side power supply circuit 11 performs DC-DC conversion on the input voltage $V_{IN}$ to thereby generate a supply voltage VCC having a desired voltage value, and supplies the supply voltage VCC to the primary-side control IC 10. The primary-side control IC 10 operates based on the supply voltage VCC.

The secondary-side circuit of the DC-DC converter 1a includes, in addition to the secondary winding W2, a secondary-side control IC 20 as a secondary-side control circuit, a feedback circuit 30, a synchronous rectification transistor M2, a diode D2, voltage dividing resistors R1 to R4, and an output capacitor $C_{OUT}$. The secondary-side control IC 20 is configured as a semiconductor integrated circuit. The voltage dividing resistors R1 and R2 constitute a voltage dividing circuit $DV_A$, and the voltage dividing resistors R3 and R4 constitute a voltage dividing circuit $DV_B$. The synchronous rectification transistor M2 (hereinafter referred to also as the SR transistor M2) is configured as an N-channel MOSFET. The diode D2 is a parasite diode of the SR transistor M2. Thus, the diode D2 is connected in parallel with the SR transistor M2 with the forward direction of the diode D2 pointing from the source to the drain of the SR transistor M2. The diode D2 may be a diode provided separately from the parasite diode.

One end of the secondary winding W2 is connected to the output terminal P2, and thus to the one end of the secondary winding W2, the output voltage $V_{OUT}$ is applied. The other end of the secondary winding W2 is connected to the drain of the SR transistor M2. The voltage at the other end of the secondary winding W2 (in other words, the drain voltage of the SR transistor M2) is represented by "$V_{DR}$". The connection node between the other end of the secondary winding W2 and the drain of the SR transistor M2 is connected to one end of the voltage dividing resistor R1, and the other end of the voltage dividing resistor R1 is connected to the ground GND2 via the voltage dividing resistor R2. Thus, to the connection node ND1 between the voltage dividing resistors R1 and R2, a division voltage $V_A$ is applied that results from the division of the voltage $V_{DR}$ by the voltage dividing circuit $DV_A$. On the other hand, the output terminal P2, to which the output voltage $V_{OUT}$ is applied, is connected to one end of the voltage dividing resistor R3, and the other end of the voltage dividing resistor R3 is connected to the ground GND2 via the voltage dividing resistor R4. Thus, to the connection node ND2 between the voltage dividing resistors R3 and R4, a division voltage $V_B$ is applied that results from the division of the output voltage $V_{OUT}$ by the voltage dividing circuit $DV_B$.

The source of the SR transistor M2 is connected to the ground GND2. The output capacitor $C_{OUT}$ is provided between the output terminals P2 and P3, and the output voltage $V_{OUT}$ is applied across the output capacitor $C_{OUT}$. A resistor for detecting an overcurrent may be provided between the output capacitor $C_{OUT}$ and the load (not shown) of the DC-DC converter 1a.

In the DC-DC converter 1a, the secondary-side control IC 20 uses the output voltage $V_{OUT}$ as the drive voltage, and controls the gate voltage of the SR transistor M2 based on the voltage $V_A$ or based on the voltages $V_A$ and $V_B$ to thereby control the turning on and off of the SR transistor M2. Here, the gate voltage of the SR transistor M2 is controlled such that the transistors M1 and M2 are not on simultaneously. In the DC-DC converter 1a, the SR transistor M2 can be controlled by any of control methods including well-known ones. For example, starting with a state where the SR transistor M2 is off, the secondary-side control IC 20 in the DC-DC converter 1a turns on the SR transistor M2 in response to the falling of the voltage $V_A$ to or below a predetermined negative turn-on threshold voltage (for example, −100 mV), and then turns off the SR transistor M2 in response to the rising of the voltage $V_A$ to or above a predetermined negative turn-off threshold voltage (for example, −10 mV). The turn-off threshold voltage is higher than the turn-on threshold voltage. The secondary-side control IC 20 in the DC-DC converter 1a may control the turning on and off of the SR transistor M2 by the method described in connection with the first to third embodiments.

In the DC-DC converter 1a, a photocoupler 31 is provided to bridge between the primary-side and secondary-side circuits. The photocoupler 31 has a light emitting element arranged in the secondary-side circuit and a light sensing element arranged in the primary-side circuit. The light emitting element of the photocoupler 31 is biased with the output voltage $V_{OUT}$ or with a division voltage of the output voltage $V_{OUT}$, and the feedback circuit 30 drives the light emitting element of the photocoupler 31 such that the output voltage $V_{OUT}$ follows the desired target voltage $V_{TG}$. For example, as shown in FIG. 11, the feedback circuit 30 is connected to the node ND2 and, based on the division voltage $V_B$ of the output voltage $V_{OUT}$, supplies a current commensurate with the error between the output voltage $V_{OUT}$ and the target voltage $V_{TG}$ to the light emitting element of the photocoupler 31. The feedback circuit 30 is configured as a shunt regulator, an error amplifier, etc.

The primary-side control IC 10 is connected to the light sensing element of the photocoupler 31, so that a feedback signal $V_{FB}$ commensurate with a feedback current $I_{FB}$ which flows through the light sensing element of the photocoupler 31 is fed to the primary-side control IC 10. Also a current detection signal $V_{CS}$ corresponding to the voltage drop across the sense resistor $R_{CS}$ is fed to the primary-side IC 10.

The primary-side control IC 10 is connected to the gate of the switching transistor M1, and feeds a pulse signal to the gate of the switching transistor M1 to thereby drive the switching of the switching transistor M1. The pulse signal is a signal with a rectangular waveform of which the signal level switches between low level and high level. When the gate of the transistor M1 is fed with a low-level signal or a high-level signal, the transistor M1 is in the off state or in the on state, respectively. There are no particular restrictions on the configuration of, or on the control method for, the primary-side control IC 10. For example, the primary-side control IC 10 may use PWM modulation (pulse width modulation) to feed a pulse signal with a duty ratio commensurate with the feedback signal $V_{FB}$ to the gate of the switching transistor M1, or may use PFM modulation (pulse frequency modulation) to feed a pulse signal with a frequency commensurate with the feedback signal $V_{FB}$ to the gate of the switching transistor M1. For another example, the primary-side control IC 10 may be a current-mode modulator. In that case, for example, the duty ratio of the pulse signal fed to the gate of the switching transistor M1 is adjusted in accordance with the current detection signal $V_{CS}$.

Figure 12:
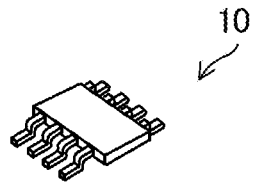
FIG. 12 is an exterior perspective view of the primary-side control IC shown in FIG. 11.

FIG. 12 shows an example of the exterior appearance of the primary-side control IC 10. The primary-side control IC 10 is an electronic component (semiconductor device) produced by enclosing a semiconductor integrated circuit in a resin housing (package), and various circuits constituting the primary-side control IC 10 are integrated together using semiconductor elements. The housing of the electronic component as the primary-side control IC 10 is provided with a plurality of external terminals exposed outside the IC 10. The number of external terminals shown in FIG. 12 is merely illustrative. The secondary-side control IC 20 has a structure similar to that of the primary-side control IC 10 shown in FIG. 12.

As part of the plurality of external terminals provided in the primary-side control IC 10, external terminals TM1a to TM5a are shown in FIG. 11. The external terminal TM1a is connected to the gate of the switching transistor M1. The external terminal TM2a is a power terminal and receives the supply voltage VCC from the primary-side power supply circuit 11. The external terminal TM3a is connected to the ground GND1. The external terminals TM4a and TM5a receive the feedback signal $V_{FB}$ and the current detection signal $V_{CS}$, respectively.

Now, with focus on the primary-side circuit, a more detailed description will be given of the configuration and the operation of part of the primary-side circuit. Note that, in connection with this embodiment, the following description assumes that a voltage mentioned with no specific reference given is a voltage relative to the potential of the ground GND1, and that, unless otherwise noted, 0 V (zero volts) refers to the potential of the ground GND1.

Figure 13:
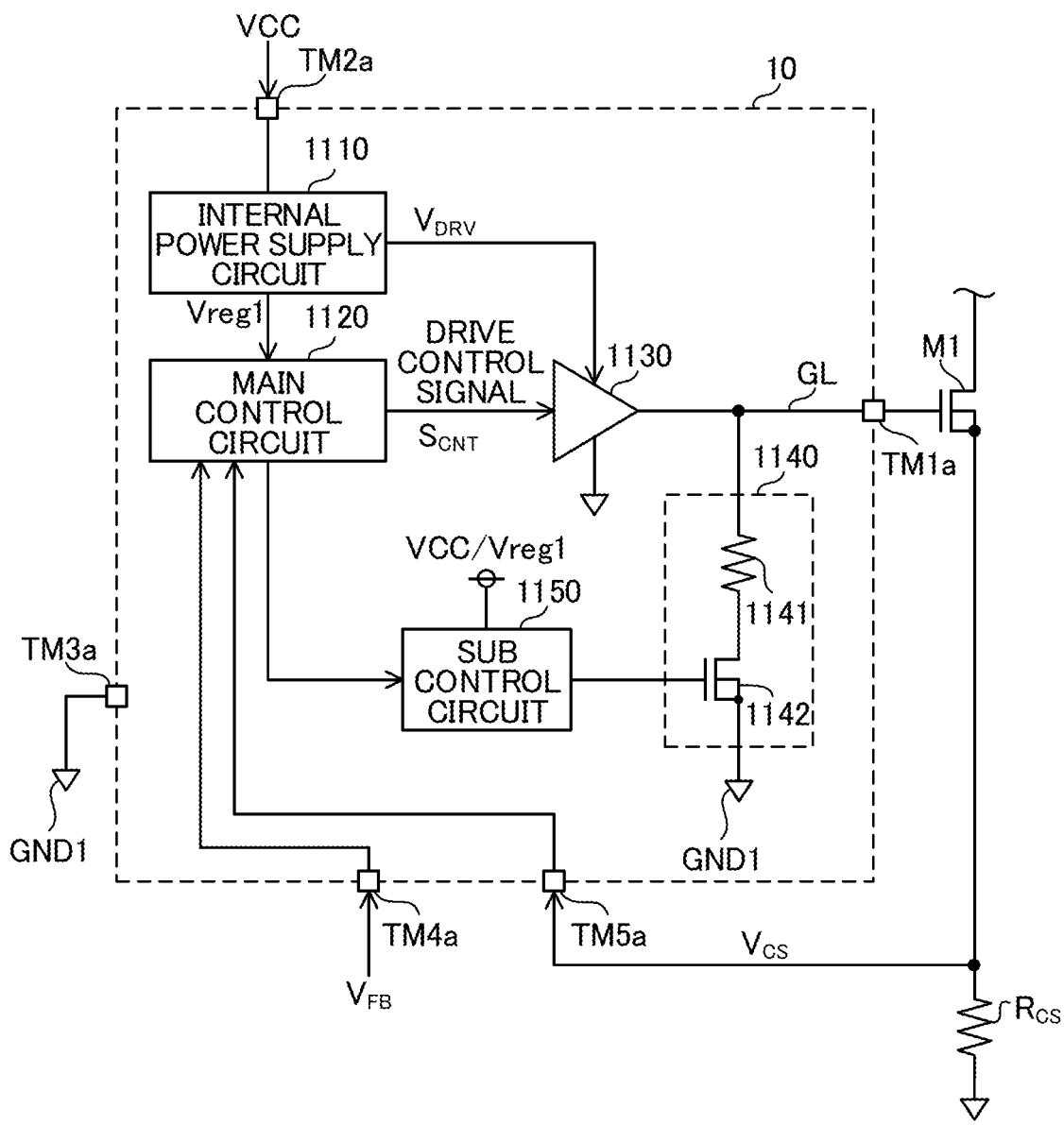
FIG. 13 is an outline block diagram of the primary-side control IC shown in FIG. 11.

FIG. 13 shows an outline of an internal configuration of the primary-side control IC 10. In the DC-DC converter 1a, the primary-side control IC 10 includes an internal power supply circuit 1110, a main control circuit 1120, a drive circuit 1130, a pull-down circuit 1140, and a sub control circuit 1150.

The internal power supply circuit 1110 performs DC-DC conversion on the supply voltage VCC fed to the external terminal TM2a to thereby generate one or more other direct-current voltages. Here, it is assumed that the direct-current voltages generated by the internal power supply circuit 1110 include an internal supply voltage Vreg1 and a driving voltage $V_{DRV}$. The internal supply voltage Vreg1 and the driving voltage $V_{DRV}$ are each a positive direct-current voltage with a predetermined voltage value. For example, the supply voltage VCC is a voltage of 14 V or more, and the voltages Vreg1 and $V_{DRV}$ are 4 V and 12 V, respectively.

The main control circuit 1120 operates based on the internal supply voltage Vreg1. The main control circuit 1120 is configured as a logic circuit, or as an analog circuit plus a logic circuit. Based on at least one of the feedback signal $V_{FB}$ and the current detection signal $V_{CS}$, the main control circuit 1120 generates a drive control signal $S_{CNT}$ for making the switching transistor M1 perform switching, and feeds the drive control signal $S_{CNT}$ to the drive circuit 1130. The drive control signal $S_{CNT}$ may be, for example, a signal modulated by PWM or PFM.

The drive circuit 1130 operates based on the driving voltage $V_{DRV}$. The drive circuit 1130 is connected to the external terminal TM1a and controls the gate voltage of the switching transistor M1 according to the drive control signal $S_{CNT}$. In other words, the drive circuit 1130 adjusts the voltage level at the output terminal TM1a under the control of the main control circuit 1120. The external terminal TM1a is, outside the IC10, connected to the gate of the switching transistor M1. A conductor that connects the drive circuit 1130 to the gate of the switching transistor M1 will be referred to as the gate line GL.

Figure 14:
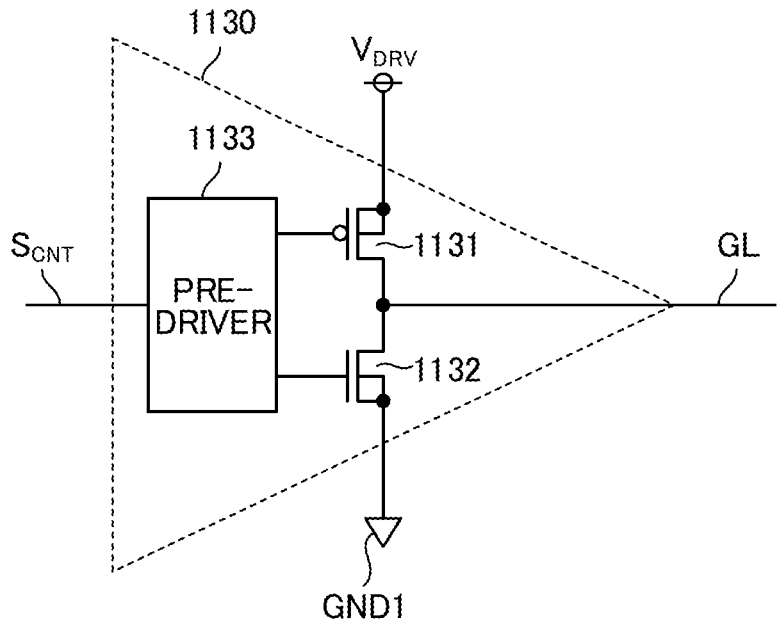
FIG. 14 is an internal configuration diagram of the pull-down circuit shown in FIG. 13.

FIG. 14 shows an example of the internal configuration of the drive circuit 1130. The drive circuit 1130 shown in FIG. 14 includes transistors 1131 and 1132, which are connected in series with each other, and a pre-driver 1133. The transistor 1131 is configured as a P-channel MOSFET, and the transistor 1132 is configured as an N-channel MOSFET. A modification is possible where the transistor 1131 is configured as an N-channel MOSFET. To the series circuit composed of the transistors 1131 and 1132, the driving voltage $V_{DRV}$ is applied. More specifically, the driving voltage $V_{DRV}$ is applied to the source of the transistor 1131, the drains of the transistors 1131 and 1132 are connected together, and the source of the transistor 1132 is connected to the ground GND1. The connection node between the drains of the transistors 1131 and 1132 is connected to the gate line GL. The pre-driver 1133 controls the turning on and off of the transistors 1131 and 1132 according to the drive control signal $S_{CNT}$ from the main control circuit 1120. The drive control signal $S_{CNT}$ is a binary signal which is either at high level or at low level.

When the drive control signal $S_{CNT}$ is at high level, the pre-driver 1133 feeds a low-level signal to the gates of the transistors 1131 and 1132 to thereby turn the transistors 1131 and 1132 to the on and off states, respectively. When the transistors 1131 and 1132 are in the on and off states, respectively, the potential at the gate line GL turns, through a transient state, to high level (the level of the driving voltage $V_{DRV}$), so that the switching transistor M1 turns to the on state.

When the drive control signal $S_{CNT}$ is at low level, the pre-driver 1133 feeds a high-level signal to the gates of the transistors 1131 and 1132 to thereby turn the transistors 1131 and 1132 to the off and on states, respectively. When the transistors 1131 and 1132 are in the off and on states, respectively, the potential at the gate line GL turns, through a transient state, to low level (the level of the ground GND1), so that the switching transistor M1 turns to the off state.

Here, to prevent the transistors 1131 and 1132 from being in the on state simultaneously, the pre-driver 1133 may as necessary insert a dead time in which the transistors 1131 and 1132 are both in the off state.

The main control circuit 1120 can, by feeding the drive control signal $S_{CNT}$, of which the signal level switches between high level and low level, to the drive circuit 1130, make the transistor M1 perform switching (that is, switch the switching transistor M1 between the on and off states).

The operation described above is performed after, with the internal supply voltage Vreg1 fed to the main control circuit 1120, the mail control circuit 1120 has started up.

Figure 15:
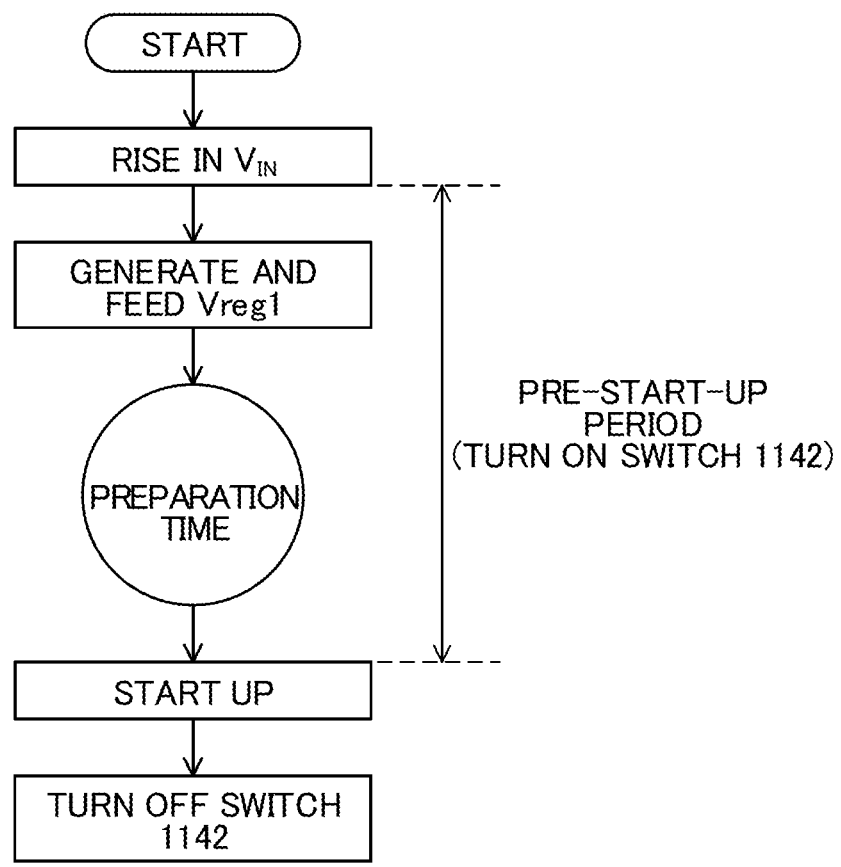
FIG. 15 is a diagram showing a sequence of events leading to the start-up of the primary-side control IC shown in FIG. 11.

As shown in FIG. 15, in the process of the input voltage $V_{IN}$ rising from 0 V to a specified voltage, the internal supply voltage Vreg1 is generated from the supply voltage VCC based on the rising input voltage $V_{IN}$, and the main control circuit 1120 starts up by receiving the internal supply voltage Vreg1; here, the main control circuit 1120 starts up not immediately on receiving the internal supply voltage Vreg1 but when a predetermined preparation time has elapsed after receiving the internal supply voltage Vreg1 (more precisely, after the voltage value of the internal supply voltage Vreg1 fed to the main control circuit 1120 reaches a predetermined voltage value). This preparation time is a time provided to ensure normal operation of the circuits inside the main control circuit 1120, and can naturally include the time taken until the internal supply voltage Vreg1 stabilizes. The preparation time depends on the circuit configuration and the start-up sequence of the main control circuit 1120, and can be, for example, as short as about several tens of nanoseconds or as long as several tens of microseconds.

The period after the input voltage $V_{IN}$ becomes higher than 0 V until the main control circuit 1120 starts up will be referred to as "the pre-start-up period" (see FIG. 15) for convenience's sake. Before the main control circuit 1120 starts up, including during the pre-start-up period, the main control circuit 1120 neither generates the drive control signal $S_{CNT}$ for making the switching transistor M1 perform switching nor feeds it to the drive circuit 1130, and the generation of the drive control signal $S_{CNT}$ and the feeding of it the drive circuit 1130 are performed after the main control circuit 1120 has started up.

Before the main control circuit 1120 starts up, including during the pre-start-up period, the drive circuit 1130 is in a high-impedance state. When the transistors. 1131 and 1132 are both in the off state, the drive circuit 1130 is in the high-impedance state. Here, the impedance of the drive circuit 1130 refers to the impedance of the drive circuit 1130 as seen from the gate line GL. After the main control circuit 1120 has started up, basically one of the transistors 1131 and 1132 is on, and thus the impedance of the drive circuit 1130 as seen from the gate line GL is sufficiently low (for example, several hundred milliohms). Before the main control circuit 1120 starts up, including during the pre-start-up period, the impedance of the drive circuit 1130 as seen from the gate line GL is far higher (for example, several hundred megohms) than after the main control circuit 1120 has started up.

Thus, in the pre-start-up period, if charge is stored on the gate line GL, the switching transistor M1 may turn on to cause an unexpected excessive current to flow through the primary winding W1 and the transistor M1. Such an undesired event can be prevented by simply pulling down the gate line GL with a pull-down resistor, but then a current continuously flows through the pull-down resistor even after the main control circuit 1120 has started up, resulting in wasteful power consumption in the pull-down resistor.

To cope with this, the primary-side control IC 10 shown in FIG. 13 is provided with the pull-down circuit 1140 and the sub control circuit 1150. The pull-down circuit 1140 is a series circuit composed of a pull-down resistor 1141 and a switch 1142. One end of the pull-down resistor 1141 is connected to the gate line GL, the other end of the pull-down resistor 1141 is connected to one end of the switch 1142, and the other end of the switch 1142 is connected to the ground GND1. Thus, only when the switch 1142 is on, is the gate line GL connected to the ground GND1 via the pull-down resistor 1141, and when the switch 1142 is off, no current flows between the gate line GL and the ground GND1 via the pull-down circuit 1140 (here, a leakage current is ignored).

The switch 1142 is controlled between on and off states by the sub control circuit 1150. The sub control circuit 1150, in the pre-start-up period, keeps the switch 1142 on to thereby keep the gate line GL at low level and the switching transistor M1 off (see FIG. 15). Then, after the main control circuit 1120 has started up, the sub control circuit 1150 keeps the switch 1142 off. The time point at which the switch 1142 is turned from the on state to the off state may be the very time point that the main control circuit 1120 starts up, or may be any time point after the main control circuit 1120 has started up. For example, on starting up after the lapse of the above-mentioned preparation time, the main control circuit 1120 can send a predetermined start-up signal to the sub control circuit 1150 without delay. In response to receiving the start-up signal, the sub control circuit 1150 turns the switch 1142 from the on state to the off state, and thereafter keeps the switch 1142 in the off state. Here, in sending the start-up signal to the sub control circuit 1150, the main control circuit 1120 can send the start-up signal also to the drive circuit 1130. The drive circuit 1130 may be configured to keep the transistors 1131 and 1132 in the off state regardless of the level of the signal $S_{CNT}$ until the start-up signal is received.

The switch 1142 can comprise one or more transistors of any kind, and here, the switch 1142 is assumed to be configured as an N-channel MOSFET, and the switch 1142 will occasionally be referred to as the transistor 1142. One end of the pull-down resistor 1141 is connected to the gate line GL, the other end of the pull-down resistor 1141 is connected to the drain of the transistor 1142, and the source of the transistor 1142 is connected to the ground GND1. The sub control circuit 1150 controls the gate voltage of the transistor 1142 to control the turning on and off of the transistor 1142.

The sub control circuit 1150 operates based on the supply voltage VCC or Vreg1. The sub control circuit 1150 can turn on the transistor 1142 in the pre-start-up period by feeding the supply voltage VCC or Vreg1 directly to the gate of the transistor 1142 or by feeding to the gate of the transistor 1142 a voltage obtained by clamping the supply voltage VCC at a desired voltage. After receiving the start-up signal mentioned above, the sub control circuit 1150 keeps the gate voltage of the transistor 1142 at low level (0 V) to keep the transistor 1142 off.

According to this embodiment, before the main control circuit 1120 starts up, the pull-down resistor 1141 operates to ensure the off state of the switching transistor M1. This helps suppress occurrence of such incidences where, before the main control circuit 1120 starts up, the switching transistor M1 turns on to cause an unexpected excessive current to flow through the primary winding W1 and the transistor M1. After the main control circuit 1120 has started up, no current flows through the pull-down resistor 1141, and thus no power is wasted (no wasteful power consumption occurs in the pull-down resistor 1141) after the main control circuit 1120 has started up.

When the supply voltage VCC is 0 V or substantially 0 V, the transistor 1142 is in the off state or in an indefinite state, and as a result, the switching transistor M1 can be in the on state; even so, when the supply voltage VCC is 0 V or substantially 0 V, the input voltage $V_{IN}$ also is expected to be 0 V or substantially 0 V, and thus no problem arises. In a period (the pre-start-up period) in which the input capacitor $C_{IN}$ has been fed with charge and the input voltage $V_{IN}$ has started to rise from 0 V but the internal supply voltage Vreg1 is unstable or the main control circuit 1120 has not ended its start-up sequence yet and thus the main control circuit 1120 has not started up yet, the pull-down circuit 1140 and the sub control circuit 1150 function effectively to ensure the off state of the switching transistor M1.

The pull-down circuit 1140 is provided for the purpose of leading the gate charge in the transistor M1 remaining at the end of the previous operation of the DC-DC converter 1*a* to the ground GND1, and thus the resistance value of the pull-down resistor 1141 may be, for example, about several tens of kilohms to several hundred kilohms. An auxiliary resistor with a resistance value of several gigaohms may be provided in parallel with the pull-down circuit 1140.

Fifth Embodiment

A fifth embodiment of the present invention will be described. The fifth embodiment, and also the sixth and seventh embodiments described later, is an embodiment based on the fourth embodiment. Accordingly, for any feature of the fifth to seventh embodiments of which no particular description is given, unless inconsistent, the corresponding description of the fourth embodiment may apply to the fifth to seventh embodiments. Any feature of the fifth embodiment that is inconsistent with one of the fourth embodiment, the description of that feature of the fifth embodiment may prevail (the same applies to the sixth and seventh embodiments described later). Unless inconsistent, any two or more of the fourth to seventh embodiments can be combined together, or any two or more of the first to seventh embodiments can be combined together.

In the fourth embodiment, the DC-DC converter 1*a* is configured as an isolated synchronous-rectification DC-DC converter, but the DC-DC converter 1a may be configured otherwise as desired, so long as it generates an output voltage $V_{OUT}$ on the secondary side of the transformer TR (that is, in the secondary-side circuit) from the input voltage $V_{IN}$ applied to the primary winding W1.

For example, in the DC-DC converter 1a shown in FIG. 11, what is called a low-side application is adopted, but a high-side application may be adopted instead. If a high-side application is adopted in the DC-DC converter 1a, the SR transistor M2 is provided on the output terminal P2 side, and the SR transistor M2 is inserted in series between the output terminal P2, to which the output voltage $V_{OUT}$ is applied, and the secondary winding W2 of the transformer TR. It is possible to change in any other manner the position at which the SR transistor M2 is arranged in the secondary-side circuit in a manner that does not depart from the technical concept of the present invention.

For another example, the DC-DC converter 1a may be a DC-DC converter (an isolated diode rectification DC-DC converter) using a rectification diode. In that case, in the DC-DC converter 1a, instead of the SR transistor M2 and the parasite diode D2 shown in FIG. 11, a rectification diode is provided in the secondary-side circuit. The rectification diode is inserted between the secondary winding W2 and the output capacitor $C_{OUT}$, and rectifies the power propagated from the primary winding W1 to the secondary winding W2.

For another example, the DC-DC converter 1a may be configured as a forward isolated DC-DC converter, and also in that case, whichever of the synchronous-rectification type and the rectification-diode type may be adopted.

Sixth Embodiment

A sixth embodiment of the present invention will be described. The sixth embodiment deals with uses of an isolated DC-DC converter according to the present invention.

Figure 16:
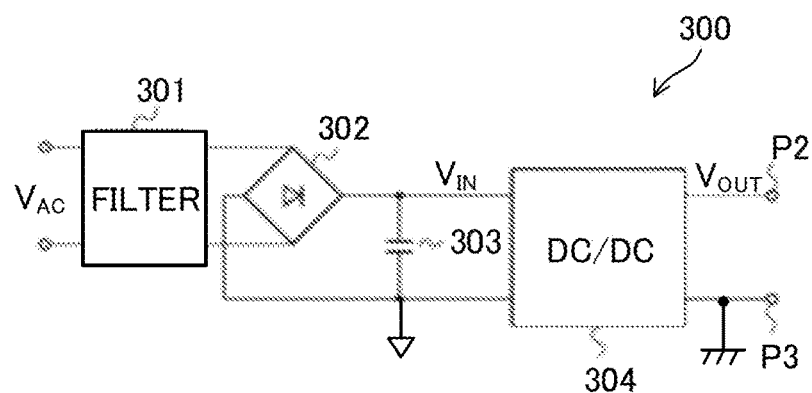
FIG. 16 is a diagram showing a configuration of an AC-DC converter according to a sixth embodiment of the present invention.

As shown in FIG. 16, it is possible to configure an AC-DC converter 300 which uses a DC-DC converter according to the present invention. The AC-DC converter 300 includes a filter 301, a rectification circuit 302, a smoothing capacitor 303, and a DC-DC converter 304. The filter 301 eliminates noise in an alternating-current voltage $V_{AC}$ fed to the AC-DC converter 300. The alternating-current voltage $V_{AC}$ can be a commercial alternating-current voltage. The rectification circuit 302 is a diode-bridge circuit which performs full-wave rectification on the alternating-current voltage $V_{AC}$ fed to it via the filter 301. The smoothing capacitor 303 smooths the full-wave rectified voltage to thereby generate a direct-current voltage. The DC-DC converter 304 receives the direct-current voltage generated across the smoothing capacitor 303 as the input voltage $V_{IN}$ and performs power conversion (DC-DC conversion) on the input voltage $V_{IN}$ to thereby generate an output voltage $V_{OUT}$. The DC-DC converter 1 or 1a described in connection with any one of the first to fifth embodiments can be used as the DC-DC converter 304. In that case, the input capacitor $C_{IN}$ shown in FIG. 1 or 11 corresponds to the smoothing capacitor 303.

Figure 17:
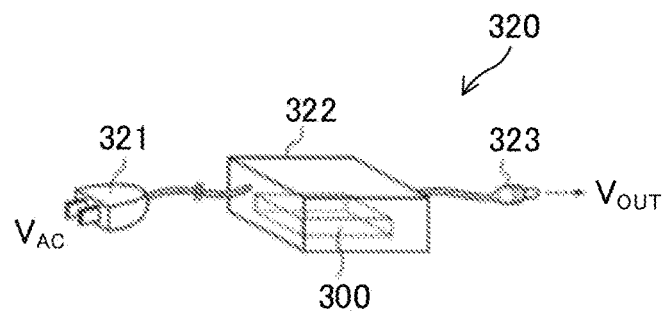
FIG. 17 is a diagram showing a configuration of a power adapter according to the sixth embodiment of the present invention.

It is possible to configure a power adapter by using the AC-DC converter 300. FIG. 17 is a diagram showing a power adapter 320 which includes the AC-DC converter 300. The power adapter 320 includes the AC-DC converter 300, a plug 321, a housing 322, and an output connector 323, and the AC-DC converter 300 is housed and arranged inside the housing 322. The plug 321 receives the commercial alternating-current voltage $V_{AC}$ from an unillustrated outlet, and the AC-DC converter 300 generates a direct-current output voltage $V_{OUT}$ from the commercial alternating-current voltage $V_{AC}$ fed in via the plug 321. The output voltage $V_{OUT}$ is supplied, via the output connector 323, to any unillustrated electric appliance. Examples of the electric appliance include notebook personal computers, personal digital assistants, digital cameras, digital video cameras, mobile phones (including those classified as smartphones), and mobile audio players.

Figure 18A:
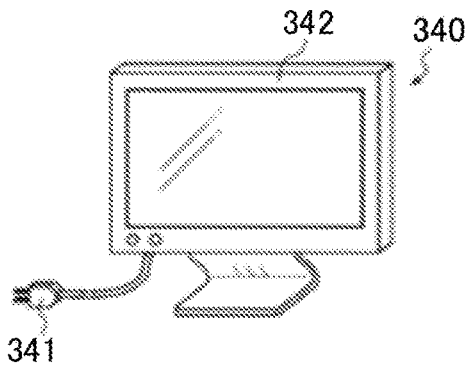
FIG. 18A and FIG. 18B are diagrams showing a configuration of an electric appliance according to the sixth embodiment of the present invention.
Figure 18B:
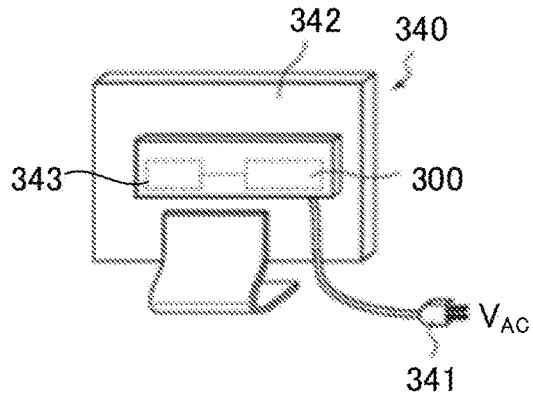

It is also possible to configure an electric appliance which includes the AC-DC converter 300. FIG. 18A and FIG. 18B are diagrams showing an electric appliance 340 including the AC-DC converter 300. The electric appliance 340 shown in FIG. 18A and FIG. 18B is a display apparatus, but there is no particular restriction on the kind of the electric appliance 340, and the electric appliance 340 may instead be an audio appliance, a refrigerator, a washing machine, a vacuum cleaner, or any other appliance that includes an AC-DC converter. The electric appliance 340 includes the AC-DC converter 300, a plug 341, a housing 342, and a load 343, and the AC-DC converter 300 and the load 343 are housed and arranged inside the housing 322. The plug 341 receives a commercial alternating-current voltage $V_{AC}$ from an unillustrated outlet, and the AC-DC converter 300 generates a direct-current output voltage $V_{OUT}$ from the commercial alternating-current voltage $V_{AC}$ fed in via the plug 341. The thus generated output voltage $V_{OUT}$ is supplied to the load 343. The load 343 may be any load that operates based on the output voltage $V_{OUT}$, such as a microcomputer, a DSP (digital signal processor), a power supply circuit, an illumination appliance, an analog circuit, or a digital circuit.

Seventh Embodiment

A seventh embodiment of the present invention will be described. The seventh embodiment deals with some modified techniques and the like applicable to the first to sixth embodiments.

As described previously, the circuit elements of the secondary-side control IC 20 are formed in the form of a semiconductor integrated circuit, and the semiconductor integrated circuit is enclosed in a resin housing (package) to thereby produce a semiconductor device. Instead, a plurality of discrete components may be used to build circuits equivalent to those in the secondary-side control IC 20. Some of the circuit elements described above as being included in the secondary-side control IC 20 may be provided outside the secondary-side control IC 20 to be externally connected to the secondary-side control IC 20. Reversely, some of the circuit elements described above as being provided outside the secondary-side control IC 20 may be provided inside the secondary-side control IC 20.

With respect to any signal or voltage, the relationship between their high and low levels may be reversed in a manner that does not depart from the technical concept discussed above.

A modification is possible in which FETs of N and P channel types are interchanged.

The secondary-side control IC 20 functions as a synchronous rectification controlling device (synchronous rectification transistor controlling device) that controls the SR transistor M2. The synchronous rectification controlling device may include, in addition to the secondary-side control IC 20, some other components. For example, the voltage dividing circuits $DV_A$ and $DV_B$ can be understood as being included in the components of the synchronous rectification controlling device.

As described above, the circuit elements of the primary-side control IC 10 are formed in the form of a semiconductor integrated circuit, and the semiconductor integrated circuit is enclosed in a resin housing (package) to thereby produce a semiconductor device. Instead, a plurality of discrete components may be used to build circuits equivalent to those in the primary-side control IC 10. Some of the circuit elements described above as being included in the primary-side control IC 10 may be provided outside the primary-side control IC 10 to be externally connected to the primary-side control IC 10. Reversely, some of the circuit elements described above as being provided outside the primary-side control IC 10 may be provided inside the primary-side control IC 10.

The primary-side control IC 10 shown in FIG. 13 functions as a gate driving device for driving the gate of a target transistor. The target transistor for the primary-side control IC 10 is the switching transistor M1 provided in the primary-side circuit of the isolated DC-DC converter 1*a*. This, however, is not meant to limit the target transistor in the present invention; instead, the target transistor may be any voltage-controlled transistor of which the gate needs to be driven.

Figure 19:
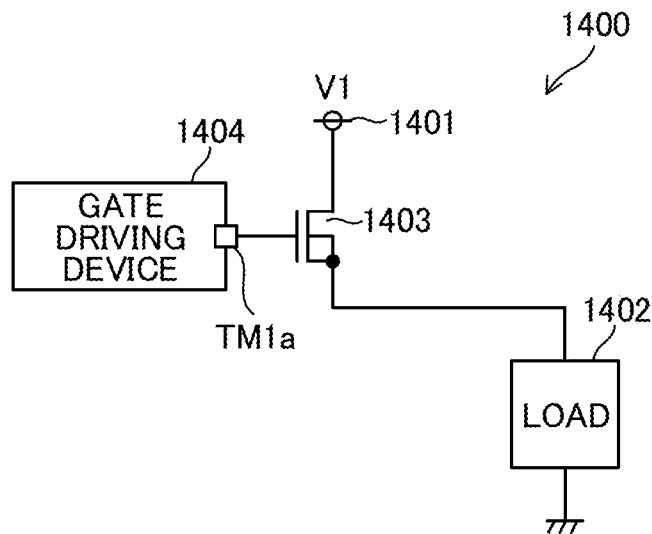
FIG. 19 is a diagram showing a configuration of a load driving device according to a seventh embodiment of the present invention.

For example, as shown in FIG. 19, in a load driving device 1400 which controls an output transistor 1403 inserted in series between a line 1401 to which a predetermined direct-current supply voltage V1 is applied and a load 1402 to thereby supply power to the load 1402 via the output transistor 1403, the output transistor 1403 can be treated as the target transistor. The load driving device 1400 can be provided with a gate driving device 1404 having a configuration equivalent to the primary-side control IC 10 so as to drive the gate of the output transistor 1403 by using the gate driving device 1404. The output terminal TM1*a* of the gate driving device 1404 is connected to the gate of the output transistor 1403, and the gate driving device 1404 feeds a pulse signal to the gate of the output transistor 1403 to thereby drive the switching of the output transistor 1403. The supply voltage VCC for the gate driving device 1404 is, for example, the voltage V1.

In the configuration shown in FIG. 19, the target transistor (1403) and the load (1402) are connected in series with each other, and when the target transistor (1403) is on, a current based on the direct-current supply voltage V1 is supplied to the load (1402) via the target transistor (403).

For another example, a switching transistor in a non-isolated switching power supply circuit can be taken as a target transistor, and a gate driving device having a configuration equivalent to the primary-side control IC 10 may be applied to the target transistor.

Figure 20:
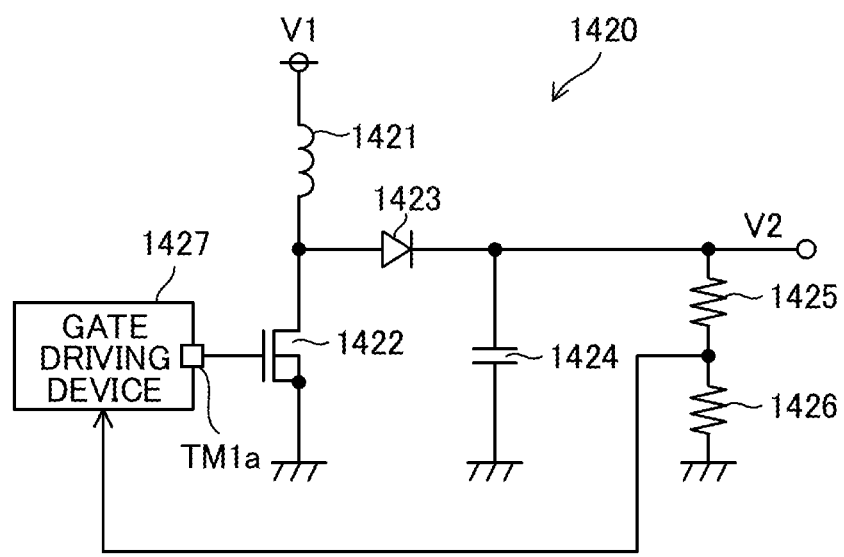
FIG. 20 is a diagram showing a configuration of a non-isolated step-up DC-DC converter according to the seventh embodiment of the present invention.

As an example, FIG. 20 shows a non-isolated step-up DC-DC converter 1420. The non-isolated step-up DC-DC converter 1420 includes components identified by the reference signs "1421" to "1427". In the non-isolated step-up DC-DC converter 1420, a predetermined direct-current input voltage V1 is applied to one end of an inductor 1421, and the other end of the inductor 1421 is connected to the drain of a switching transistor 1422 configured as an N-channel MOSFET and also to the anode of a diode 1423. The cathode of the diode 1423 is connected to one end of a smoothing capacitor 1424. The other end of the smoothing capacitor 1424 and the source of the switching transistor 1422 are connected to a ground at a reference voltage of 0 V. At the connection node between the cathode of the diode 1423 and the smoothing capacitor 1424, a direct-current output voltage V2 appears. Voltage dividing resistors 1425 and 1426 are used to feed a gate driving device 1427 with a feedback voltage commensurate with the output voltage V2. Based on the feedback voltage, the gate driving device 1427 feeds a pulse signal to the gate of the switching transistor 1422 to thereby drive the switching of the switching transistor 1422 so that the output voltage V2 stabilizes at a desired target voltage that is higher than the voltage V1. Here, the switching transistor 1422 is treated as the target transistor, and a configuration equivalent to the primary-side control IC 10 is applied to the gate driving device 1427. Accordingly, the output terminal TM1*a* of the gate driving device 1427 is connected to the gate of the transistor 1422. The supply voltage VCC for the gate driving device 1427 is, for example, the voltage V1.

In the configurations shown in FIG. 11 and FIG. 20, the target transistor (M1 or 1422) and the coil (W1 or 1421) are connected in series with each other so that, when the target transistor is on, a current based on the direct-current voltage ($V_{IN}$ or V1) flows through the target transistor and the coil. The coil here corresponds to the primary winding W1 in the configuration shown in FIG. 11, and corresponds to the inductor 1421 in the configuration shown in FIG. 20.

The transistors described above can each be a transistor of any kind. For example, a transistor described above as a MOSFET may be replaced with a junction FET, an IGBT (insulated-gate bipolar transistor), or a bipolar transistor. Any transistor has a first electrode, a second electrode, and a control electrode. In an FET, one of the first and second electrodes corresponds to the drain, the other of them corresponds to the source, and the control electrode corresponds to the gate. In an IGBT, one of the first and second electrodes corresponds to the collector, the other of them corresponds to the emitter, and the control electrode corresponds to the gate. In a bipolar transistor that does not belong to the IGBT, one of the first and second electrodes corresponds to the collector, the other of them corresponds to the emitter, and the control electrode corresponds to the base.

The target transistor discussed above is a voltage-controlled transistor such as an FET, which can be a MOSFET, or an IGBT (that is, a transistor in which the current flowing between the first and second electrodes is controlled based on the voltage at the control electrode).

The embodiments of the present invention allow for many modifications made as necessary within the scope of the technical concept set forth in the appended claims. The embodiments described above are merely examples of how the present invention can be implemented, and the senses of the terms used to define the present invention and its features are not limited to those in which they are used in the description of the embodiments given above. All specific values mentioned in the above description are merely examples, and can naturally be altered to different values.

What is claimed is:

1. A synchronous rectification controlling device for controlling a synchronous rectification transistor arranged on a secondary side in a flyback isolated synchronous-rectification DC-DC converter, the synchronous rectification controlling device comprising:
    a turn-on control circuit configured to turn on the synchronous rectification transistor in response to a switching transistor connected to a primary winding of a transformer in the DC-DC converter turning off; and
    a turn-off control circuit configured to control turning-off of the synchronous rectification transistor,
    wherein the turn-off control circuit is configured:
       in an on-period of the switching transistor, to generate
          an on-period signal commensurate with a magnitude of an induced voltage appearing in a secondary winding of the transformer and a length of the on-period, and,
after the synchronous rectification transistor turns on, to determine a turn-off time point of the synchronous rectification transistor based on the on-period signal and an output voltage of the DC-DC converter,
wherein the turn-off control circuit is configured, in the on-period of the switching transistor, to generate a current commensurate with the magnitude of the induced voltage appearing in the secondary winding of the transformer and thereby generate a signal commensurate with a value of said current and the length of the on-period as the on-period signal, and
wherein the turn-off control circuit:
has a capacitor, and
is configured to generate the on-period signal across said capacitor in the on-period of the switching transistor by passing said current via said capacitor.

2. The synchronous rectification controlling device according to claim 1, wherein
the turn-off control circuit is configured, in the on-period of the switching transistor, to generate a current commensurate with the magnitude of the induced voltage appearing in the secondary winding of the transformer and thereby generate a signal commensurate with a value of said current and the length of the on-period as the on-period signal.

3. The synchronous rectification controlling device according to claim 1, wherein
said current is a first current, and
the turn-off control circuit is configured, in an off-period of the switching transistor,
to pass via said capacitor a second current which flows in a direction opposite to the first current and which is commensurate with the output voltage of the DC-DC converter, and
to turn off the synchronous rectification transistor when a voltage across said capacitor reaches a predetermined voltage.

4. The synchronous rectification controlling device according to claim 3, wherein
the synchronous rectification controlling device has
a first terminal receiving a division voltage, produced by a first voltage dividing circuit, of a voltage appearing at a connection node between the secondary winding and the synchronous rectification transistor and
a second terminal receiving a division voltage of the output voltage produced by a second voltage dividing circuit,
the turn-off control circuit
has a first resistor and a second resistor, and
is configured,
in the on-period of the switching transistor, to pass via said capacitor as the first current a difference current between a current that depends on the first resistor and a voltage at the first terminal and a current that depends on the second resistor and a voltage at the second terminal, and
in the off-period of the switching transistor, to pass via said capacitor in the direction opposite to the first current as the second current the current that depends on the second resistor and the voltage at the second terminal.

5. The synchronous rectification controlling device according to claim 4, wherein a voltage division ratio of the first voltage dividing circuit and a voltage division ratio of the second voltage dividing circuit are equal to each other, and
a resistance value of the first resistor and a resistance value of the second resistor are equal to each other.

6. A flyback isolated synchronous-rectification DC-DC converter comprising:
a transformer having a primary winding and a secondary winding;
a switching transistor connected to the primary winding;
a synchronous rectification transistor connected to the secondary winding;
a primary-side control circuit configured to control turning on and off of the switching transistor; and
a secondary-side control circuit configured to control turning on and off of the synchronous rectification transistor,
wherein
the synchronous rectification controlling device according to claim 1 is used as the secondary-side control circuit.

7. An AC-DC converter comprising:
a rectification circuit configured to perform full-wave rectification on an alternating-current voltage;
a smoothing capacitor configured to smooth a full-wave rectified voltage to thereby generate a direct-current voltage; and
the isolated synchronous-rectification DC-DC converter according to claim 6 generating a direct-current output voltage from an input voltage as the direct-current voltage.

8. A power adapter comprising:
a plug receiving an alternating-current voltage;
the AC-DC converter according to claim 7; and
a housing in which the AC-DC converter is housed.

9. An electric appliance comprising:
the AC-DC converter according to claim 7; and
a load driven based on an output voltage of the AC-DC converter.

10. The synchronous rectification controlling device according to claim 1, wherein
said capacitor is a first capacitor,
the turn-off control circuit further has a second capacitor separately from the first capacitor, and
the turn-off control circuit is configured, in the off-period of the switching transistor,
to pass via the second capacitor a current commensurate with the output voltage of the DC-DC converter, and
to turn off the synchronous rectification transistor when a voltage across the second capacitor reaches a voltage of the on-period signal.

11. The synchronous rectification controlling device according to claim 1, wherein the synchronous rectification controlling device is formed as a semiconductor integrated circuit.

12. A gate driving device comprising:
a main control circuit configured to generate a drive control signal; and
a drive circuit connected to a gate of a target transistor via a gate line and configured to drive the gate of the target transistor based on the drive control signal from the main control circuit, wherein
the gate driving device further comprises
a series circuit composed of a resistor and a switch and inserted in series between the gate line and a predetermined potential point, and a sub control circuit configured to turn on the switch before the main control circuit starts up and to turn off the switch after the main control circuit has started up, wherein:
the drive circuit has a first transistor and a second transistor connected in series with each other,
a direct-current driving voltage is applied to a series circuit composed of the first and second transistors,
a connection node between the first and second transistors is connected to the gate line,
after the main control circuit has started up, one of the first and second transistors is on based on the drive control signal, and
before the main control circuit starts up, the first and second transistors are both off.

13. The gate driving device according to claim 12 further comprising:
a power terminal receiving a supply voltage; and
an internal power supply circuit configured to generate an internal supply voltage based on the supply voltage received,
wherein the main control circuit is configured to start up a predetermined preparation time after receiving the internal supply voltage.

14. The gate driving device according to claim 13, wherein
the target transistor is a switching transistor connected to a primary winding of a transformer in an isolated DC-DC converter, and
the supply voltage is generated based on an input voltage to the DC-DC converter as applied to one end of the primary winding.

15. An isolated DC-DC converter comprising:
a transformer having a primary winding and a secondary winding;
a switching transistor connected to the primary winding; and
a primary-side control circuit configured to control turning on and off of the switching transistor,
the isolated DC-DC converter generating an output voltage on a secondary side of the transformer from an input voltage applied to the primary winding,
wherein
the gate driving device according to claim 12 is used as the primary-side control circuit, and
the gate driving device drives switching of the switching transistor as the target transistor.

16. An AC-DC converter comprising:
a rectification circuit configured to perform full-wave rectification on an alternating-current voltage;
a smoothing capacitor configured to smooth a full-wave rectified voltage to thereby generate a direct-current voltage; and
the isolated DC-DC converter according to claim 15 generating a direct-current output voltage from an input voltage as the direct-current voltage.

17. A power adapter comprising:
a plug receiving an alternating-current voltage;
the AC-DC converter according to claim 16; and
a housing in which the AC-DC converter is housed.

18. An electric appliance comprising:
the AC-DC converter according to claim 16; and
a load driven based on an output voltage of the AC-DC converter.

19. The gate driving device according to claim 12, wherein
an impedance of the drive circuit as seen from the gate line is higher before the main control circuit starts up than after the main control circuit has started up.

20. The gate driving device according to claim 12, wherein the target transistor is a switching transistor connected to a primary winding of a transformer in an isolated DC-DC converter.

21. The gate driving device according to claim 12, wherein the gate driving device is formed as a semiconductor integrated circuit.

* * * * *